United States Patent
Zhang et al.

(10) Patent No.: US 12,265,544 B2
(45) Date of Patent: Apr. 1, 2025

(54) DOMAIN KNOWLEDGE GUIDED SELECTION OF NODES FOR ADDITION TO DATA TREES

(71) Applicant: Ancestry.com Operations Inc., Lehi, UT (US)

(72) Inventors: Xiaoxuan Zhang, San Francisco, CA (US); Sijia Zhang, San Francisco, CA (US); Yen-Yun Yu, Murray, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 39 days.

(21) Appl. No.: 17/831,439

(22) Filed: Jun. 3, 2022

(65) Prior Publication Data

US 2022/0382770 A1     Dec. 1, 2022

Related U.S. Application Data

(63) Continuation of application No. PCT/IB2022/054655, filed on May 19, 2022.

(60) Provisional application No. 63/191,192, filed on May 20, 2021.

(51) Int. Cl.
*G06F 15/16* (2006.01)
*G06F 16/2457* (2019.01)
*G06N 20/00* (2019.01)

(52) U.S. Cl.
CPC ....... *G06F 16/24578* (2019.01); *G06N 20/00* (2019.01)

(58) Field of Classification Search
None
See application file for complete search history.

(56) References Cited

U.S. PATENT DOCUMENTS

| 2011/0246401 A1 | 10/2011 | Arora | |
|---|---|---|---|
| 2013/0318047 A1 | 11/2013 | Hale et al. | |
| 2015/0046436 A1* | 2/2015 | Li | G06Q 30/02 707/723 |
| 2017/0358302 A1* | 12/2017 | Orr | G10L 15/22 |

(Continued)

FOREIGN PATENT DOCUMENTS

WO    WO 2021/011105 A1    1/2021

OTHER PUBLICATIONS

PCT International Search Report and Written Opinion, PCT Application No. PCT/IB2022/054655, Aug. 25, 2022, ten pages.

*Primary Examiner* — Alex Gofman
(74) *Attorney, Agent, or Firm* — Keller Preece PLLC

(57) ABSTRACT

A computing server may continuously update a set of nodes that are addable to a data tree based on past interactions of the user with one or more nodes. The computing server may track a recently interacted set of interacted nodes with which the user has interacted within a number of past interactions. The computing server may select a pool of candidate nodes based on the recently interacted set. At least one of the candidate nodes is within a domain boundary of one of the interacted nodes that is in the recently interacted set. The domain boundary may be determined by the degree of relationship. The computing server may present one or more candidate nodes in the pool as a version of the continuously updated set of nodes. The computing server may update the pool of candidate nodes as additional interactions performed by the user updates the recently interacted set.

17 Claims, 11 Drawing Sheets

(56) References Cited

U.S. PATENT DOCUMENTS

| | | | |
|---|---|---|---|
| 2018/0268467 A1* | 9/2018 | Labarre | G06F 16/9027 |
| 2019/0251603 A1* | 8/2019 | Jaatinen | G06N 3/006 |
| 2021/0064812 A1* | 3/2021 | Walkingshaw | G06F 40/103 |
| 2021/0073657 A1* | 3/2021 | Neelamegam Vetharaman | G06F 16/288 |
| 2021/0201199 A1* | 7/2021 | Neumann | G06N 3/045 |

* cited by examiner

| | | |
|---|---|---|
| Map of Union Cemetery<br>Member photo<br>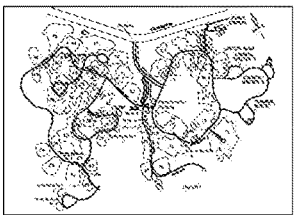 | Date Submitted<br>Description<br><br><br><br>Submitted by<br>Attached To<br>Birth<br>Death | 6/9/2017<br>Section P back plot #34; Simmons plot; Section Q plot #49 Dunbar plot; 38 Cable Family marker<br>AAA<br>Jane Johnson<br>Abt. 1886<br>17 Oct 1910<br>[Save] [Ignore] |
| Layout of Johnson plot<br>Member photo<br>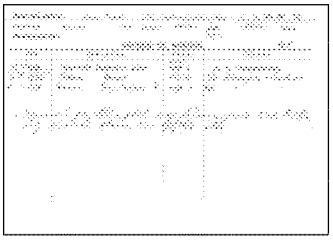 | Date Submitted<br>Description<br><br>Submitted by<br>Attached To<br>Birth<br>Death | 6/7/2013<br>Back of card used to locate and identify plot within the Section P<br>BBB<br>Jane Johnson<br>Abt. 1886<br>17 Oct 1910<br>[Save] [Ignore] |
| Layout of Johnson plot<br>Member photo<br>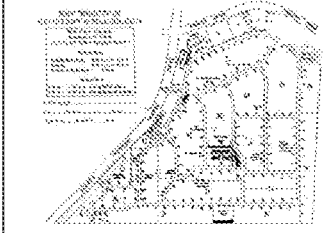 | Date Submitted<br>Description<br><br><br><br><br><br>Submitted by<br>Attached To<br>Birth<br>Death | 6/10/2019<br>Photo of card Cemetery employee used to help locate plots; 1. Jane Johnson, 2. Helen Smith, 3. John Johnson age 6 months 1921 – no headstone, infant 1 day<br>Read More<br>CCC<br>Jane Johnson<br>Abt. 1886<br>17 Oct 1910<br>[Save] [Ignore] |

| model | Success Rate | | | Relevancy |
|---|---|---|---|---|
| | % improvement on hint_acceptance | % improvement on search_success | % improvement on general | %agree@10 |
| equal | 20.312358 | -1.645653 | 15.434927 | 25.900407 |
| penalize_hint | 15.420604 | 41.019430 | 19.751895 | 19.482962 |
| boost_search | 20.697690 | 30.771286 | 20.394438 | 20.367954 |
| base | -7.978734 | 52.872628 | 11.782703 | 16.160149 |
| random | -2.381826 | 16.120385 | 1.432986 | 14.704294 |

- %agree@10  The % of recommended text nodes are actually interacted in the coming 10 steps.
- R+  Average number of discovery over the steps that the model agrees with the user.
- R-  Average number of discovery over the steps that the model disagrees with the user.
- Improvement %  100 * (R+ - R-) / R-.

*FIG. 9*

DOMAIN KNOWLEDGE GUIDED SELECTION OF NODES FOR ADDITION TO DATA TREES

CROSS-REFERENCE TO RELATED APPLICATION

The present application is a continuation of International Application No: PCT/IB2022/054655, filed on May 19, 2022, which claims the benefit of U.S. Provisional Patent Application No. 63/191,192, filed on May 20, 2021. The entire contents of both are hereby incorporated by reference in their entirety.

FIELD

The disclosed embodiments relate to presenting nodes of a database for linking the nodes to a data tree and, more specifically, to automatically suggesting nodes using domain knowledge-guided machine learning models.

BACKGROUND

A large-scale database such as a genealogical database can include billions of data records. This type of database may allow users to build data trees, research various data entries, and make meaningful discoveries about information of various related data nodes and entries. Users may try to identify related nodes in the database and link related nodes. However, identifying related nodes in the sheer amount of data is not a trivial task. Datasets associated with different individuals may not be connected without a proper determination of how the datasets are related. Comparing a large number of datasets without a concrete strategy may also be computationally infeasible because each dataset may also include a large number of data bits. Given an individual node and a database with nodes that are potentially related to the individual node, it is often challenging to identify a node in the database that is associated with the individual node.

SUMMARY

Disclosed herein relates to example embodiments for continuously updating a set of nodes addable to a data tree. An example process performed by a computing server may include generating for display, in a graphical user interface, an initial set of nodes that are addable to the data tree associated with a user. The process may also include receiving one or more selections from the user to interact with one or more nodes. The process may further include generating a continuously updated set of nodes for display in the graphical user interface. The continuously updated set of nodes may be updated based on past interactions of the user with one or more nodes. Generating the continuously updated set of nodes may include tracking a recently interacted set of one or more interacted nodes with which the user has interacted within a number of past interactions. The computing server performing the process may also select a pool of candidate nodes based on the recently interacted set. At least one of the candidate nodes is within a domain boundary of one of the interacted nodes that is in the recently interacted set. The computing server may further present one or more candidate nodes in the pool as a version of the continuously updated set of nodes. The computing server may further update the pool of candidate nodes as additional interactions performed by the user updates the recently interacted set.

In some embodiments, selecting the pool of candidate nodes based on the set of one or more interacted nodes is performed by a machine learning model. Selecting the pool of candidate nodes including: collecting candidate nodes that are within the domain boundary of at least one of interacted nodes in the recently interacted set; inputting a first set of features associated with the user to the machine learning model; inputting a second set of features representing the candidate nodes to the machine learning model; ranking the candidate nodes using the machine learning model based on the first and second sets of features; and selecting one or more candidate nodes as the continuously updated set based on the ranking.

In some embodiments, the machine learning model is a reinforcement model.

In some embodiments, the reinforcement model is associated with a reward, state features, and action features.

In some embodiments, the reward is associated with a success rate for nodes in the continuously updated set of nodes to be added to the data tree, the state features include a feature of the user, and the action features include a feature of a node.

In some embodiments, generating a continuously updated set of nodes is further based on one or more user-level features.

In some embodiments, generating a continuously updated set of nodes is further based on one or more tree-level features.

In some embodiments, generating a continuously updated set of nodes is further based on one or more relevancy features, a relevancy feature measuring a rate of an action taken by the user on a node.

In some embodiments, generating a continuously updated set of nodes is further based on one or more success rate features, a success rate feature measuring a rate of whether the user adds a node to the data tree.

In some embodiments, the data tree is a family tree associated with the user and a node is a genealogical record representing an individual.

In some embodiments, the domain boundary of one of the interacted nodes is a boundary based on a degree of relationship from the one of the interacted nodes.

In some embodiments, the user's interaction with one of the nodes includes one or more of the following: clicking the node to review additional data, saving the node, printing the node, adding the node to the data tree associated with the user, and/or comparing the node with another node.

In some embodiments, the number of past interactions is predetermined.

In some embodiments, a system for continuously updating a set of nodes addable to a data tree may include a graphical user interface and a computing device for generating the continuously updated set of nodes for display in a graphical user interface.

In yet another embodiment, a non-transitory computer-readable medium that is configured to store instructions is described. The instructions, when executed by one or more processors, cause the one or more processors to perform a process that includes steps described in the above computer-implemented methods or described in any embodiments of this disclosure. In yet another embodiment, a system may include one or more processors and a storage medium that is configured to store instructions. The instructions, when executed by one or more processors, cause the one or more processors to perform a process that includes steps described in the above computer-implemented methods or described in any embodiments of this disclosure.

BRIEF DESCRIPTION OF THE DRAWINGS

Figure (FIG. 1 illustrates a diagram of a system environment of an example computing system, in accordance with some embodiments.

FIG. 4 is a conceptual diagram illustrating an example graphical user interface for a user to review a list of nodes that may be added to a data tree of the user, in accordance with some embodiments.

FIG. 9 is a graphical illustration of another experimental result of the performance of some instances of example machine learning models compared to baselines, in accordance with some embodiments.

Figure 1:
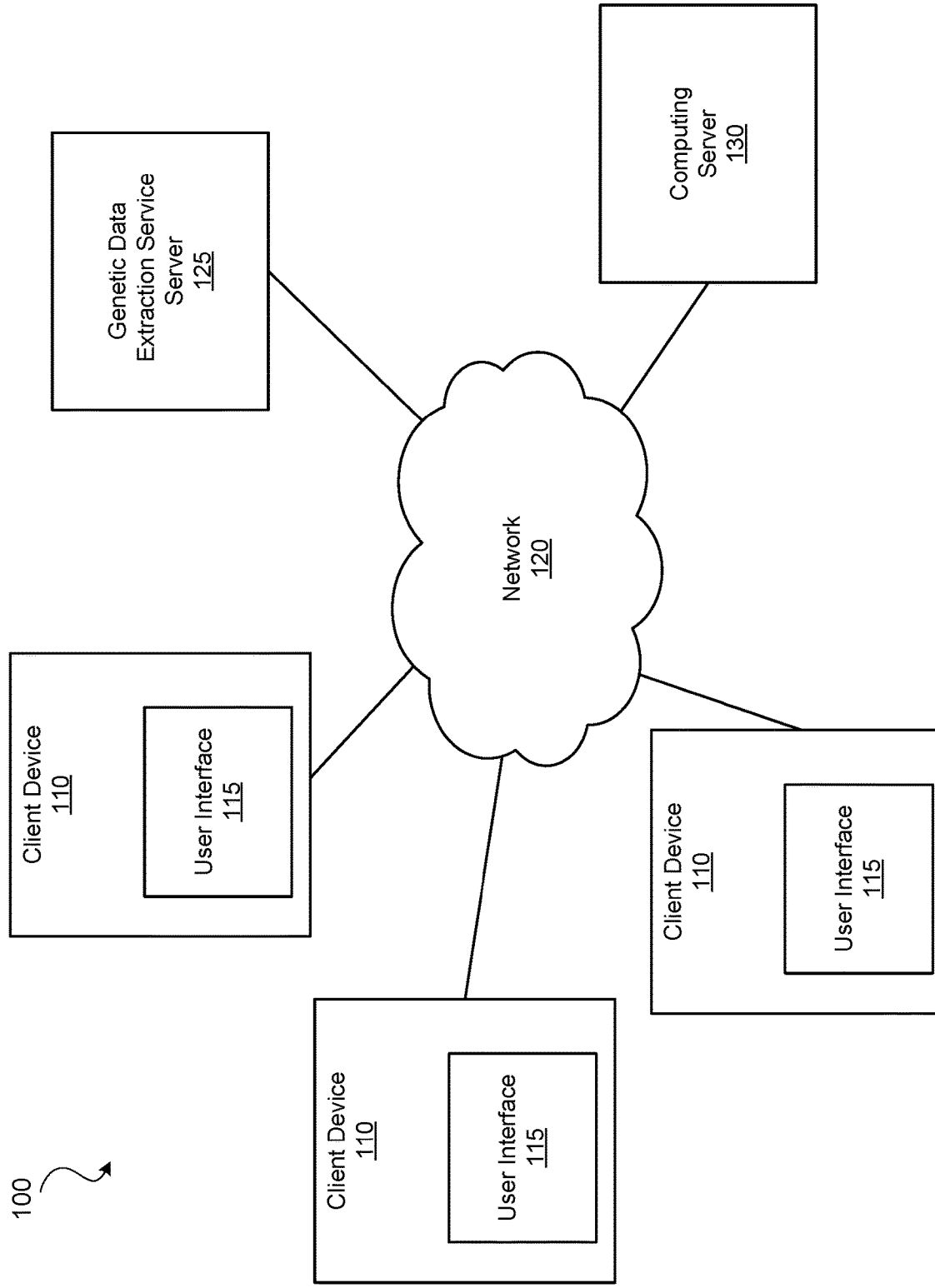

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Genealogy research systems harness information in historical records and may utilize genetic analyses to help users to identify ancestors and build family trees. In a genealogy research system according to some embodiments, family trees may take the form of a data tree that represents family members and genealogical records as nodes and establish family relationships (father, grandmother, spouse, etc.) as edges. The family trees may also allow the system to measure the degrees of relationship (kinship distance). Recent development in automation technologies, artificial intelligence and cloud computing have enabled the digitization of billions of historical records and encouraged millions of people to build and share their family trees online. However, effectively building a family tree out of a vast amount of data records often requires expertise in designing an effective research plan. To address this challenge, a computing system according to some embodiments may provide users with recommendations that suggest the next nodes for users to review.

In some embodiments, a graphical user interface that displays a list of potential nodes recommended by a computing system is provided. The computing system may monitor the interactions by a user on the recommended nodes. The computing system may track a set of recently interacted nodes and identify a pool of candidate nodes that are within the domain boundaries of those recently interacted nodes. The pool of candidate nodes represents the nodes that may be displayed in the next round of recommended list. The computing system may use a machine learning model such as a domain knowledge incorporated reinforcement learning model to rank and select the candidate nodes to decide which candidate nodes will be displayed in the next round. The selection of nodes based on domain knowledge of recently interacted nodes provide an effective way to guide users to build a family tree.

Example System Environment

FIG. 1 illustrates a diagram of a system environment 100 of an example computing server 130, in accordance with an embodiment. The system environment 100 shown in FIG. 1 includes one or more client devices 110, a network 120, a genetic data extraction service server 125, and a computing server 130. In various embodiments, the system environment 100 may include fewer or additional components. The system environment 100 may also include different components.

The client devices 110 are one or more computing devices capable of receiving user input as well as transmitting and/or receiving data via a network 120. Example computing devices include desktop computers, laptop computers, personal digital assistants (PDAs), smartphones, tablets, wearable electronic devices (e.g., smartwatches), smart household appliance (e.g., smart televisions, smart speakers, smart home hubs), Internet of Things (IoT) devices or other suitable electronic devices. A client device 110 communicates to other components via the network 120. Users may be customers of the computing server 130 or any individuals who access the system of the computing server 130, such as an online website or a mobile application. In one embodiment, a client device 110 executes an application that launches a graphical user interface (GUI) for a user of the client device 110 to interact with the computing server 130. The GUI may be an example of a user interface 115. A client device 110 may also execute a web browser application to enable interactions between the client device 110 and the computing server 130 via the network 120. In another embodiment, the user interface 115 may take the form of a software application published by the computing server 130 and installed on the user device 110. In yet another embodiment, a client device 110 interacts with the computing server 130 through an application programming interface (API)

running on a native operating system of the client device 110, such as IOS or ANDROID.

The network 120 provides connections to the components of the system environment 100 through one or more subnetworks, which may include any combination of local area and/or wide area networks, using both wired and/or wireless communication systems. In one embodiment, a network 120 uses standard communications technologies and/or protocols. For example, a network 120 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML) or extensible markup language (XML). In some embodiments, all or some of the communication links of a network 120 may be encrypted using any suitable technique or techniques such as secure sockets layer (SSL), transport layer security (TLS), virtual private networks (VPNs), Internet Protocol security (IPsec), etc. The network 120 also includes links and packet switching networks such as the Internet.

Individuals, who may be customers of a company operating the computing server 130, provide biological samples for analysis of their genetic data. Individuals may also be referred to as users. In one embodiment, an individual uses a sample collection kit to provide a biological sample (e.g., saliva, blood, hair, tissue) from which genetic data is extracted and determined according to nucleotide processing techniques such as amplification and sequencing. Amplification may include using polymerase chain reaction (PCR) to amplify segments of nucleotide samples. Sequencing may include sequencing of deoxyribonucleic acid (DNA) sequencing, ribonucleic acid (RNA) sequencing, etc. Suitable sequencing techniques may include Sanger sequencing and massively parallel sequencing such as various next-generation sequencing (NGS) techniques including whole genome sequencing, pyrosequencing, sequencing by synthesis, sequencing by ligation, and ion semiconductor sequencing. In one embodiment, a set of SNPs (e.g., 300,000) that are shared between different array platforms (e.g., Illumina OmniExpress Platform and Illumina HumanHap 650Y Platform) may be obtained as the genetic data. Genetic data extraction service server 125 receives biological samples from users of the computing server 130. The genetic data extraction service server 125 performs sequencing of the biological samples and determines the base pair sequences of the individuals. The genetic data extraction service server 125 generates the genetic data of the individuals based on the sequencing results. The genetic data may include data sequenced from DNA or RNA and may include base pairs from coding and/or noncoding regions of DNA.

The genetic data may take different forms and include information regarding various biomarkers of an individual. For example, in one embodiment, the genetic data may be the base pair sequence of an individual. The base pair sequence may include the whole genome or a part of the genome such as certain genetic loci of interest. In another embodiment, the genetic data extraction service server 125 may determine genotypes from sequencing results, for example by identifying genotype values of single nucleotide polymorphisms (SNPs) present within the DNA. The results in this example may include a sequence of genotypes corresponding to various SNP sites. A SNP site may also be referred to as a SNP loci. A genetic locus is a segment of a genetic sequence. A locus can be a single site or a longer stretch. The segment can be a single base long or multiple bases long. In one embodiment, the genetic data extraction service server 125 may perform data pre-processing of the genetic data to convert raw sequences of base pairs to sequences of genotypes at target SNP sites. Since a typical human genome may differ from a reference human genome at only several million SNP sites (as opposed to billions of base pairs in the whole genome), the genetic data extraction service server 125 may extract only the genotypes at a set of target SNP sites and transmit the extracted data to the computing server 130 as the genetic dataset of an individual. SNPs, base pair sequence, genotype, haplotype, RNA sequences, protein sequences, phenotypes are examples of biomarkers.

The computing server 130 performs various analyses of the genetic data, genealogical data, and users' survey responses to generate results regarding the phenotypes and genealogy of users of computing server 130. Depending on the embodiments, the computing server 130 may also be referring to as an online server, a personal genetic service server, a genealogy server, a family tree building server, and/or a social networking system. The computing server 130 receives genetic data from the genetic data extraction service server 125 and stores the genetic data in the data store of the computing server 130. The computing server 130 may analyze the data to generate results regarding the genetics or genealogy of users. The results regarding the genetics or genealogy of users may include the ethnicity compositions of users, paternal and maternal genetic analysis, identification or suggestion of potential family relatives, ancestor information, analyses of DNA data, potential or identified traits such as phenotypes of users (e.g., diseases, appearance traits, other genetic characteristics, and other non-genetic characteristics including social characteristics), etc. The computing server 130 may present or cause the user interface 115 to present the results to the users through a GUI displayed at the client device 110. The results may include graphical elements, textual information, data, charts, and other elements such as family trees.

In one embodiment, the computing server 130 also allows various users to create one or more genealogical profiles of the user. The genealogical profile may include a list of individuals (e.g., ancestors, relatives, friends, and other people of interest) who are added or selected by the user or suggested by the computing server 130 based on the genealogical records and/or genetic records. The user interface 115 controlled by or in communication with the computing server 130 may display the individuals in a list or as a family tree such as in the form of a pedigree chart. In one embodiment, subject to user's privacy setting and authorization, the computing server 130 may allow information generated from the user's genetic dataset to be linked to the user profile and to one or more of the family trees. The users may also authorize the computing server 130 to analyze their genetic dataset and allow their profiles to be discovered by other users.

Example Computing Server Architecture

Figure 2:
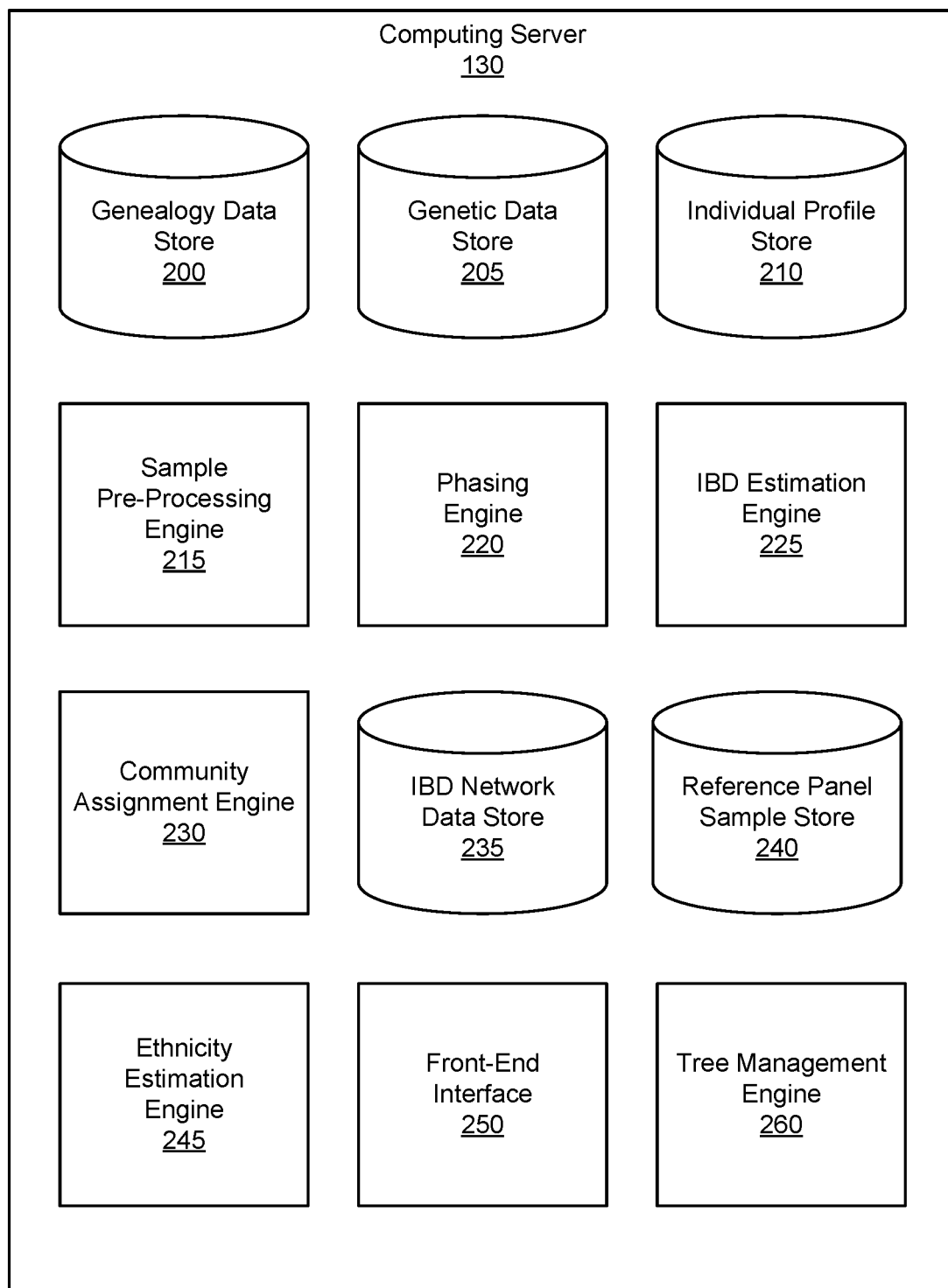
FIG. 2 is a block diagram of an architecture of an example computing system, in accordance with some embodiments.

FIG. 2 is a block diagram of an architecture of an example computing server 130, in accordance with an embodiment. In the embodiment shown in FIG. 2, the computing server 130 includes a genealogy data store 200, a genetic data store 205, an individual profile store 210, a sample pre-processing engine 215, a phasing engine 220, an identity by descent (IBD) estimation engine 225, a community assignment engine 230, an IBD network data store 235, a reference panel sample store 240, an ethnicity estimation engine 245, and a front-end interface 250. The functions of the computing server 130 may be distributed among the elements in a different manner than described. In various embodiments, the computing server 130 may include different components and fewer or additional components. Each of the various data stores may be a single storage device, a server controlling multiple storage devices, or a distributed network that is accessible through multiple nodes (e.g., a cloud storage system).

The computing server 130 stores various data of different individuals, including genetic data, genealogical data, and survey response data. The computing server 130 processes the genetic data of users to identify shared identity-by-descent (IBD) segments between individuals. The genealogical data and survey response data may be part of user profile data. The amount and type of user profile data stored for each user may vary based on the information of a user, which is provided by the user as she creates an account and profile at a system operated by the computing server 130 and continues to build her profile, family tree, and social network at the system and to link her profile with her genetic data. Users may provide data via the user interface 115 of a client device 110. Initially and as a user continues to build her genealogical profile, the user may be prompted to answer questions related to the basic information of the user (e.g., name, date of birth, birthplace, etc.) and later on more advanced questions that may be useful for obtaining additional genealogical data. The computing server 130 may also include survey questions regarding various traits of the users such as the users' phenotypes, characteristics, preferences, habits, lifestyle, environment, etc.

Genealogical data may be stored in the genealogical data store 200 and may include various types of data that are related to tracing family relatives of users. Examples of genealogical data include names (first, last, middle, suffixes), gender, birth locations, date of birth, date of death, marriage information, spouse's information kinships, family history, dates and places for life events (e.g., birth and death), other vital data, and the like. In some instances, family history can take the form of a pedigree of an individual (e.g., the recorded relationships in the family). The family tree information associated with an individual may include one or more specified nodes. Each node in the family tree represents the individual, an ancestor of the individual who might have passed down genetic material to the individual, and the individual's other relatives including siblings, cousins, offspring in some cases. Genealogical data may also include connections and relationships among users of the computing server 130. The information related to the connections among a user and her relatives that may be associated with a family tree may also be referred to as pedigree data or family tree data.

In addition to user-input data, genealogical data may also take other forms that are obtained from various sources such as public records and third-party data collectors. For example, genealogical records from public sources include birth records, marriage records, death records, census records, court records, probate records, adoption records, obituary records, etc. Likewise, genealogical data may include data from one or more of a pedigree of an individual, the Ancestry World Tree system, a Social Security Death Index database, the World Family Tree system, a birth certificate database, a death certificate database, a marriage certificate database, an adoption database, a draft registration database, a veterans database, a military database, a property records database, a census database, a voter registration database, a phone database, an address database, a newspaper database, an immigration database, a family history records database, a local history records database, a business registration database, a motor vehicle database, and the like.

Furthermore, the genealogical data store 200 may also include relationship information inferred from the genetic data stored in the genetic data store 205 and information received from the individuals. For example, the relationship information may indicate which individuals are genetically related, how they are related, how many generations back they share common ancestors, lengths and locations of IBD segments shared, which genetic communities an individual is a part of, variants carried by the individual, and the like.

The computing server 130 maintains genetic datasets of individuals in the genetic data store 205. A genetic dataset of an individual may be a digital dataset of nucleotide data (e.g., SNP data) and corresponding metadata. A genetic dataset may contain data of the whole or portions of an individual's genome. The genetic data store 205 may store a pointer to a location associated with the genealogical data store 200 associated with the individual. A genetic dataset may take different forms. In one embodiment, a genetic dataset may take the form of a base pair sequence of the sequencing result of an individual. A base pair sequence dataset may include the whole genome of the individual (e.g., obtained from a whole-genome sequencing) or some parts of the genome (e.g., genetic loci of interest).

In another embodiment, a genetic dataset may take the form of sequences of genetic markers. Examples of genetic markers may include target SNP loci (e.g., allele sites) filtered from the sequencing results. A SNP locus that is single base pair long may also be referred to a SNP site. A SNP locus may be associated with a unique identifier. The genetic dataset may be in a form of diploid data that includes a sequencing of genotypes, such as genotypes at the target SNP loci, or the whole base pair sequence that includes genotypes at known SNP loci and other base pair sites that are not commonly associated with known SNPs. The diploid dataset may be referred to as a genotype dataset or a genotype sequence. Genotype may have a different meaning in various contexts. In one context, an individual's genotype may refer to a collection of diploid alleles of an individual. In other contexts, a genotype may be a pair of alleles present on two chromosomes for an individual at a given genetic marker such as a SNP site.

Genotype data for a SNP site may include a pair of alleles. The pair of alleles may be homozygous (e.g., A-A or G-G) or heterozygous (e.g., A-T, C-T). Instead of storing the actual nucleotides, the genetic data store 205 may store genetic data that are converted to bits. For a given SNP site, oftentimes only two nucleotide alleles (instead of all 4) are observed. As such, a 2-bit number may represent a SNP site. For example, 00 may represent homozygous first alleles, 11 may represent homozygous second alleles, and 01 or 10 may represent heterozygous alleles. A separate library may store what nucleotide corresponds to the first allele and what nucleotide corresponds to the second allele at a given SNP site.

A diploid dataset may also be phased into two sets of haploid data, one corresponding to a first parent side and another corresponding to a second parent side. The phased datasets may be referred to as haplotype datasets or haplotype sequences. Similar to genotype, haplotype may have a different meaning in various contexts. In one context, a haplotype may also refer to a collection of alleles that corresponds to a genetic segment. In other contexts, a haplotype may refer to a specific allele at a SNP site. For example, a sequence of haplotypes may refer to a sequence of alleles of an individual that are inherited from a parent.

The individual profile store 210 stores profiles and related metadata associated with various individuals appeared in the computing server 130. A computing server 130 may use unique individual identifiers to identify various users and other non-users that might appear in other data sources such as ancestors or historical persons who appear in any family tree or genealogical database. A unique individual identifier may a hash of certain identification information of an individual, such as a user's account name, user's name, date of birth, location of birth, or any suitable combination of the information. The profile data related to an individual may be stored as metadata associated with an individual's profile. For example, the unique individual identifier and the metadata may be stored as a key-value pair using the unique individual identifier as a key.

An individual's profile data may include various kinds of information related to the individual. The metadata about the individual may include one or more pointer associating genetic datasets such as genotype and phased haplotype data of the individual that are saved in the genetic data store 205. The metadata about the individual may also individual information related to family trees and pedigree datasets that include the individual. The profile data may further include declarative information about the user that was authorized by the user to be shared and may also include information inferred by the computing server 130. Other examples of information stored in a user profile may include biographic, demographic, and other types of descriptive information such as work experience, educational history, gender, hobbies, or preferences, location and the like. In one embodiment, the user profile data may also include one or more photos of the users and photos of relatives (e.g., ancestors) of the users that are uploaded by the users. A user may authorize the computing server 130 to analyze one or more photos to extract information, such as the user's or relative's appearance traits (e.g., blue eyes, curved hair, etc.), from the photos. The appearance traits and other information extracted from the photos may also be saved in the profile store. In some cases, the computing server may allow users to upload many different photos of the users, their relatives, and even friends. User profile data may also be obtained from other suitable sources, including historical records (e.g., records related to an ancestor), medical records, military records, photographs, other records indicating one or more traits, and other suitable recorded data.

For example, the computing server 130 may present various survey questions to its users from time to time. The responses to the survey questions may be stored at individual profile store 210. The survey questions may be related to various aspects of the users and the users' families. Some survey questions may be related to users' phenotypes, while other questions may be related to environmental factors of the users.

Survey questions may concern health or disease-related phenotypes, such as questions related to the presence or absence of genetic diseases or disorders, inheritable diseases or disorders, or other common diseases or disorders that have a family history as one of the risk factors, questions regarding any diagnosis of increased risk of any diseases or disorders, and questions concerning wellness-related issues such as a family history of obesity, family history of causes of death, etc. The diseases identified by the survey questions may be related to single-gene diseases or disorders that are caused by a single-nucleotide variant, an insertion, or a deletion. The diseases identified by the survey questions may also be multifactorial inheritance disorders that may be caused by a combination of environmental factors and genes. Examples of multifactorial inheritance disorders may include heart disease, Alzheimer's diseases, diabetes, cancer, and obesity. The computing server 130 may obtain data of a user's disease-related phenotypes from survey questions of the health history of the user and her family and also from health records uploaded by the user.

Survey questions also may be related to other types of phenotypes such as appearance traits of the users. A survey regarding appearance traits and characteristics may include questions related to eye color, iris pattern, freckles, chin types, finger length, dimple chin, earlobe types, hair color, hair curl, skin pigmentation, susceptibility to skin burn, bitter taste, male baldness, baldness pattern, presence of unibrow, presence of wisdom teeth, height, and weight. A survey regarding other traits also may include questions related to users' taste and smell such as the ability to taste bitterness, asparagus smell, cilantro aversion, etc. A survey regarding traits may further include questions related to users' body conditions such as lactose tolerance, caffeine consumption, malaria resistance, norovirus resistance, muscle performance, alcohol flush, etc. Other survey questions regarding a person's physiological or psychological traits may include vitamin traits and sensory traits such as the ability to sense an asparagus metabolite. Traits may also be collected from historical records, electronic health records and electronic medical records.

The computing server 130 also may present various survey questions related to the environmental factors of users. In this context, an environmental factor may be a factor that is not directly connected to the genetics of the users. Environmental factors may include users' preferences, habits, and lifestyles. For example, a survey regarding users' preferences may include questions related to things and activities that users like or dislike, such as types of music a user enjoys, dancing preference, party-going preference, certain sports that a user plays, video games preferences, etc. Other questions may be related to the users' diet preference such as like or dislike a certain type of food (e.g., ice cream, egg). A survey related to habits and lifestyle may include questions regarding smoking habits, alcohol consumption and frequency, daily exercise duration, sleeping habits (e.g., morning person versus night person), sleeping cycles and problems, hobbies, and travel preferences. Additional environmental factors may include diet amount (calories, macronutrients), physical fitness abilities (e.g. stretching, flexibility, heart rate recovery), family type (adopted family or not, has siblings or not, lived with extended family during childhood), property and item ownership (has home or rents, has a smartphone or doesn't, has a car or doesn't).

Surveys also may be related to other environmental factors such as geographical, social-economic, or cultural factors. Geographical questions may include questions related to the birth location, family migration history, town, or city of users' current or past residence. Social-economic questions may be related to users' education level, income, occupations, self-identified demographic groups, etc. Questions related to culture may concern users' native language, language spoken at home, customs, dietary practices, etc. Other questions related to users' cultural and behavioral questions are also possible.

For any survey questions asked, the computing server 130 may also ask an individual the same or similar questions regarding the traits and environmental factors of the ancestors, family members, other relatives or friends of the individual. For example, a user may be asked about the native language of the user and the native languages of the user's parents and grandparents. A user may also be asked about the health history of his or her family members.

In addition to storing the survey data in the individual profile store 210, the computing server 130 may store some responses that correspond to data related to genealogical and genetics respectively to genealogical data store 200 and genetic data store 205.

The user profile data, photos of users, survey response data, the genetic data, and the genealogical data may subject to the privacy and authorization setting from the users to specify any data related to the users can be accessed, stored, obtained, or otherwise used. For example, when presented with a survey question, a user may select to answer or skip the question. The computing server 130 may present users from time to time information regarding users' selection of the extent of information and data shared. The computing server 130 also may maintain and enforce one or more privacy settings for users in connection with the access of the user profile data, photos, genetic data, and other sensitive data. For example, the user may pre-authorize the access of the data and may change the setting as wish. The privacy settings also may allow a user to specify (e.g., by opting out, by not opting in) whether the computing server 130 may receive, collect, log, or store particular data associated with the user for any purpose. A user may restrict her data at various levels. For example, on one level, the data may not be accessed by the computing server 130 for purposes other than displaying the data in the user's own profile. On another level, the user may authorize anonymization of her data and participate in studies and researches conducted by the computing server 130 such as a large-scale genetic study. On yet another level, the user may turn some portions of her genealogical data public to allow the user to be discovered by other users (e.g., potential relatives) and be connected in one or more family trees. Access or sharing of any information or data in the computing server 130 may also be subject to one or more similar privacy policies. A user's data and content objects in the computing server 130 may also be associated with different levels of restriction. The computing server 130 may also provide various notification features to inform and remind users of their privacy and access settings. For example, when privacy settings for a data entry allow a particular user or other entities to access the data, the data may be described as being "visible," "public," or other suitable labels, contrary to a "private" label.

In some cases, the computing server 130 may have a heightened privacy protection on certain types of data and data related to certain vulnerable groups. In some cases, the heightened privacy settings may strictly prohibit the use, analysis, sharing of data related to a certain vulnerable group. In other cases, the heightened privacy settings may specify that data subject to those settings require prior approval for access, publication, or other use. In some cases, the computing server 130 may provide the heightened privacy as a default setting for certain types of data, such as genetic data or any data that the user marks as sensitive. The user may opt in for sharing of those data or change the default privacy settings. In other cases, the heightened privacy settings may apply across the board for all data of certain groups of users. For example, if the computing server 130 determines that the user is a minor or has recognized that a picture of a minor is uploaded, the computing server 130 may designate all profile data associated with the minor as sensitive. In those cases, the computing server 130 may have one or more extra steps in seeking and confirming any sharing or use of the sensitive data.

The sample pre-processing engine 215 receives and pre-processes data received from various sources to change the data into a format used by the computing server 130. For genealogical data, the sample pre-processing engine 215 may receive data from an individual via the user interface 115 of the client device 110. To collect the user data (e.g., genealogical and survey data), the computing server 130 may cause an interactive user interface on the client device 110 to display interface elements in which users can provide genealogical data and survey data. Additional data may be obtained from scans of public records. The data may be manually provided or automatically extracted via, for example, optical character recognition (OCR) performed on census records, town or government records, or any other item of printed or online material. Some records may be obtained by digitalizing written records such as older census records, birth certificates, death certificates, etc.

The sample pre-processing engine 215 may also receive raw data from genetic data extraction service server 125. The genetic data extraction service server 125 may perform laboratory analysis of biological samples of users and generate sequencing results in the form of digital data. The sample pre-processing engine 215 may receive the raw genetic datasets from the genetic data extraction service server 125. The human genome mutation rate is estimated to be $1.1*10^{-8}$ per site per generation. This may lead to a variant of approximately every 300 base pairs. Most of the mutations that are passed down to descendants are related to single-nucleotide polymorphism (SNP). SNP is a substitution of a single nucleotide that occurs at a specific position in the genome. The sample pre-processing engine 215 may convert the raw base pair sequence into a sequence of genotypes of target SNP sites. Alternatively, the pre-processing of this conversion may be performed by the genetic data extraction service server 125. The sample pre-processing engine 215 identifies autosomal SNPs in an individual's genetic dataset. In one embodiment, the SNPs may be autosomal SNPs. In one embodiment, 700,000 SNPs may be identified in an individual's data and may be stored in genetic data store 205. Alternatively, in one embodiment, a genetic dataset may include at least 10,000 SNP sites. In another embodiment, a genetic dataset may include at least 100,000 SNP sites. In yet another embodiment, a genetic dataset may include at least 300,000 SNP sites. In yet another embodiment, a genetic dataset may include at least 1,000,000 SNP sites. The sample pre-processing engine 215 may also convert the nucleotides into bits. The identified SNPs, in bits or in other suitable formats, may be provided to the phasing engine 220 which phases the individual's diploid genotypes to generate a pair of haplotypes for each user.

The phasing engine 220 phases diploid genetic dataset into a pair of haploid genetic datasets and may perform imputation of SNP values at certain sites whose alleles are missing. An individual's haplotype may refer to a collection of alleles (e.g., a sequence of alleles) that are inherited from a parent.

Phasing may include a process of determining the assignment of alleles (particularly heterozygous alleles) to chromosomes. Owing to sequencing conditions and other constraints, a sequencing result often includes data regarding a pair of alleles at a given SNP locus of a pair of chromosomes but may not be able to distinguish which allele belongs to which specific chromosome. The phasing engine 220 uses a genotype phasing algorithm to assign one allele to a first chromosome and another allele to another chromosome. The genotype phasing algorithm may be developed based on an assumption of linkage disequilibrium (LD), which states that haplotype in the form of a sequence of alleles tends to cluster together. The phasing engine 220 is configured to generate phased sequences that are also commonly observed in many other samples. Put differently, haplotype sequences of different individuals tend to cluster together. A haplotype-cluster model may be generated to determine the probability distribution of a haplotype that includes a sequence of alleles. The haplotype-cluster model may be trained based on labeled data that includes known phased haplotypes from a trio (parents and a child). A trio is used as a training sample because the correct phasing of the child is almost certain by comparing the child's genotypes to the parent's genetic datasets. The haplotype-cluster model may be generated iteratively along with the phasing process with a large number of unphased genotype datasets. The haplotype-cluster model may also be used to impute one or more missing data.

By way of example, the phasing engine 220 may use a directed acyclic graph model such as a hidden Markov model (HMM) to perform phasing of a target genotype dataset. The directed acyclic graph may include multiple levels, each level having multiple nodes representing different possibilities of haplotype clusters. An emission probability of a node, which may represent the probability of having a particular haplotype cluster given an observation of the genotypes may be determined based on the probability distribution of the haplotype-cluster model. A transition probability from one node to another may be initially assigned to a non-zero value and be adjusted as the directed acyclic graph model and the haplotype-cluster model are trained. Various paths are possible in traversing different levels of the directed acyclic graph model. The phasing engine 220 determines a statistically likely path, such as the most probable path or a probable path that is at least more likely than 95% of other possible paths, based on the transition probabilities and the emission probabilities. A suitable dynamic programming algorithm such as the Viterbi algorithm may be used to determine the path. The determined path may represent the phasing result. U.S. Pat. No. 10,679,729, entitled "Haplotype Phasing Models," granted on Jun. 9, 2020, describes example embodiments of haplotype phasing.

The IBD estimation engine 225 estimates the amount of shared genetic segments between a pair of individuals based on phased genotype data (e.g., haplotype datasets) that are stored in the genetic data store 205. IBD segments may be segments identified in a pair of individuals that are putatively determined to be inherited from a common ancestor. The IBD estimation engine 225 retrieves a pair of haplotype datasets for each individual. The IBD estimation engine 225 may divide each haplotype dataset sequence into a plurality of windows. Each window may include a fixed number of SNP sites (e.g., about 100 SNP sites). The IBD estimation engine 225 identifies one or more seed windows in which the alleles at all SNP sites in at least one of the phased haplotypes between two individuals are identical. The IBD estimation engine 225 may expand the match from the seed windows to nearby windows until the matched windows reach the end of a chromosome or until a homozygous mismatch is found, which indicates the mismatch is not attributable to potential errors in phasing or imputation. The IBD estimation engine 225 determines the total length of matched segments, which may also be referred to as IBD segments. The length may be measured in the genetic distance in the unit of centimorgans (cM). A unit of centimorgan may be a genetic length. For example, two genomic positions that are one cM apart may have a 1% chance during each meiosis of experiencing a recombination event between the two positions. The computing server 130 may save data regarding individual pairs who share a length of IBD segments exceeding a predetermined threshold (e.g., 6 cM), in a suitable data store such as in the genealogical data store 200. U.S. Pat. No. 10,114,922, entitled "Identifying Ancestral Relationships Using a Continuous stream of Input," granted on Oct. 30, 2018, and U.S. Pat. No. 10,720,229, entitled "Reducing Error in Predicted Genetic Relationships," granted on Jul. 21, 2020, describe example embodiments of IBD estimation.

Typically, individuals who are closely related share a relatively large number of IBD segments, and the IBD segments tend to have longer lengths (individually or in aggregate across one or more chromosomes). In contrast, individuals who are more distantly related share relatively fewer IBD segments, and these segments tend to be shorter (individually or in aggregate across one or more chromosomes). For example, while close family members often share upwards of 71 cM of IBD (e.g., third cousins), more distantly related individuals may share less than 12 cM of IBD. The extent of relatedness in terms of IBD segments between two individuals may be referred to as IBD affinity. For example, the IBD affinity may be measured in terms of the length of IBD segments shared between two individuals.

Community assignment engine 230 assigns individuals to one or more genetic communities based on the genetic data of the individuals. A genetic community may correspond to an ethnic origin or a group of people descended from a common ancestor. The granularity of genetic community classification may vary depending on embodiments and methods used to assign communities. For example, in one embodiment, the communities may be African, Asian, European, etc. In another embodiment, the European community may be divided into Irish, German, Swedes, etc. In yet another embodiment, the Irish may be further divided into Irish in Ireland, Irish immigrated to America in 1800, Irish immigrated to America in 1900, etc. The community classification may also depend on whether a population is admixed or unadmixed. For an admixed population, the classification may further be divided based on different ethnic origins in a geographical region.

Community assignment engine 230 may assign individuals to one or more genetic communities based on their genetic datasets using machine learning models trained by unsupervised learning or supervised learning. In an unsupervised approach, the community assignment engine 230 may generate data representing a partially connected undirected graph. In this approach, the community assignment engine 230 represents individuals as nodes. Some nodes are connected by edges whose weights are based on IBD affinity between two individuals represented by the nodes. For example, if the total length of two individuals' shared IBD segments does not exceed a predetermined threshold, the nodes are not connected. The edges connecting two nodes are associated with weights that are measured based on the IBD affinities. The undirected graph may be referred to as an IBD network. The community assignment engine 230 uses clustering techniques such as modularity measurement (e.g., the Louvain method) to classify nodes into different clusters in the IBD network. Each cluster may represent a community. The community assignment engine 230 may also determine sub-clusters, which represent sub-communities. The computing server 130 saves the data representing the IBD network and clusters in the IBD network data store 235. U.S. Pat. No. 10,223,498, entitled "Discovering Population Structure from Patterns of Identity-By-Descent," granted on Mar. 5, 2019, describes example embodiments of community detection and assignment.

The community assignment engine 230 may also assign communities using supervised techniques. For example, genetic datasets of known genetic communities (e.g., individuals with confirmed ethnic origins) may be used as training sets that have labels of the genetic communities. Supervised machine learning classifiers, such as logistic regressions, support vector machines, random forest classifiers, and neural networks may be trained using the training set with labels. A trained classifier may distinguish binary or multiple classes. For example, a binary classifier may be trained for each community of interest to determine whether a target individual's genetic dataset belongs or does not belong to the community of interest. A multi-class classifier such as a neural network may also be trained to determine whether the target individual's genetic dataset most likely belongs to one of several possible genetic communities.

Reference panel sample store 240 stores reference panel samples for different genetic communities. A reference panel sample is a genetic data of an individual whose genetic data is the most representative of a genetic community. The genetic data of individuals with the typical alleles of a genetic community may serve as reference panel samples. For example, some alleles of genes may be over-represented (e.g., being highly common) in a genetic community. Some genetic datasets include alleles that are commonly present among members of the community. Reference panel samples may be used to train various machine learning models in classifying whether a target genetic dataset belongs to a community, in determining the ethnic composition of an individual, and in determining the accuracy in any genetic data analysis, such as by computing a posterior probability of a classification result from a classifier.

A reference panel sample may be identified in different ways. In one embodiment, an unsupervised approach in community detection may apply the clustering algorithm recursively for each identified cluster until the sub-clusters contain a number of nodes that are smaller than a threshold (e.g., contains fewer than 1000 nodes). For example, the community assignment engine 230 may construct a full IBD network that includes a set of individuals represented by nodes and generate communities using clustering techniques. The community assignment engine 230 may randomly sample a subset of nodes to generate a sampled IBD network. The community assignment engine 230 may recursively apply clustering techniques to generate communities in the sampled IBD network. The sampling and clustering may be repeated for different randomly generated sampled IBD networks for various runs. Nodes that are consistently assigned to the same genetic community when sampled in various runs may be classified as a reference panel sample. The community assignment engine 230 may measure the consistency in terms of a predetermined threshold. For example, if a node is classified to the same community 95% (or another suitable threshold) of times whenever the node is sampled, the genetic dataset corresponding to the individual represented by the node may be regarded as a reference panel sample. Additionally, or alternatively, the community assignment engine 230 may select N most consistently assigned nodes as a reference panel for the community.

Other ways to generate reference panel samples are also possible. For example, the computing server 130 may collect a set of samples and gradually filter and refine the samples until high-quality reference panel samples are selected. For example, a candidate reference panel sample may be selected from an individual whose recent ancestors are born at a certain birthplace. The computing server 130 may also draw sequence data from the Human Genome Diversity Project (HGDP). Various candidates may be manually screened based on their family trees, relatives' birth location, other quality control. Principal component analysis may be used to creates clusters of genetic data of the candidates. Each cluster may represent an ethnicity. The predictions of the ethnicity of those candidates may be compared to the ethnicity information provided by the candidates to perform further screening.

The ethnicity estimation engine 245 estimates the ethnicity composition of a genetic dataset of a target individual. The genetic datasets used by the ethnicity estimation engine 245 may be genotype datasets or haplotype datasets. For example, the ethnicity estimation engine 245 estimates the ancestral origins (e.g., ethnicity) based on the individual's genotypes or haplotypes at the SNP sites. To take a simple example of three ancestral populations corresponding to African, European and Native American, an admixed user may have nonzero estimated ethnicity proportions for all three ancestral populations, with an estimate such as [0.05, 0.65, 0.30], indicating that the user's genome is 5% attributable to African ancestry, 65% attributable to European ancestry and 30% attributable to Native American ancestry. The ethnicity estimation engine 245 generates the ethnic composition estimate and stores the estimated ethnicities in a data store of computing server 130 with a pointer in association with a particular user.

In one embodiment, the ethnicity estimation engine 245 divides a target genetic dataset into a plurality of windows (e.g., about 1000 windows). Each window includes a small number of SNPs (e.g., 300 SNPs). The ethnicity estimation engine 245 may use a directed acyclic graph model to determine the ethnic composition of the target genetic dataset. The directed acyclic graph may represent a trellis of an inter-window hidden Markov model (HMM). The graph includes a sequence of a plurality of node groups. Each node group, representing a window, includes a plurality of nodes. The nodes representing different possibilities of labels of genetic communities (e.g., ethnicities) for the window. A node may be labeled with one or more ethnic labels. For example, a level includes a first node with a first label representing the likelihood that the window of SNP sites belongs to a first ethnicity and a second node with a second label representing the likelihood that the window of SNPs belongs to a second ethnicity. Each level includes multiple nodes so that there are many possible paths to traverses the directed acyclic graph.

The nodes and edges in the directed acyclic graph may be associated with different emission probabilities and transition probabilities. An emission probability associated with a node represents the likelihood that the window belongs to the ethnicity labeling the node given the observation of SNPs in the window. The ethnicity estimation engine 245 determines the emission probabilities by comparing SNPs in the window corresponding to the target genetic dataset to corresponding SNPs in the windows in various reference panel samples of different genetic communities stored in the reference panel sample store 240. The transition probability between two nodes represents the likelihood of transition from one node to another across two levels. The ethnicity estimation engine 245 determines a statistically likely path, such as the most probable path or a probable path that is at least more likely than 95% of other possible paths, based on the transition probabilities and the emission probabilities. A suitable dynamic programming algorithm such as the Viterbi algorithm or the forward-backward algorithm may be used to determine the path. After the path is determined, the ethnicity estimation engine 245 determines the ethnic composition of the target genetic dataset by determining the label compositions of the nodes that are included in the determined path. U.S. Pat. No. 10,558,930, entitled "Local Genetic Ethnicity Determination System," granted on Feb. 11, 2020, describes example embodiments of ethnicity estimation.

The front-end interface 250 displays various results determined by the computing server 130. The results and data may include the IBD affinity between a user and another individual, the community assignment of the user, the ethnicity estimation of the user, phenotype prediction and evaluation, genealogical data search, family tree and pedigree, relative profile and other information. The front-end interface 250 may allow users to manage their profile and data trees (e.g., family trees). The users may view various public family trees in stored in the computing server 130 and search for individuals and their genealogical data via the front-end interface 250. The computing server 130 may suggest or allow the user to manually review and select potential related individuals (e.g., relatives, ancestors, close family members) to add to the user's data tree. The front-end interface 250 may be a graphical user interface (GUI) that displays various information and graphical elements. The front-end interface 250 may take different forms. In one case, the front-end interface 250 may be a software application that can be displayed on an electronic device such as a computer or a smartphone. The software application may be developed by the entity controlling the computing server 130 and be downloaded and installed at the client device 110. In another case, the front-end interface 250 may take the form of a webpage interface of the computing server 130 that allows users to access their family tree and genetic analysis results through web browsers. In yet another case, the front-end interface 250 may provide an application program interface (API).

The tree management engine 260 performs computations and other processes related to users' management of their data trees such as family trees. The tree management engine 260 may allow a user to build a data tree from scratch or to link the user to existing data trees. In some embodiments, the tree management engine 260 may suggest a connection between a target individual and a family tree that exists in the family tree database by identifying potential family trees for the target individual and identifying one or more most probable positions in a potential family tree. A user (target individual) may wish to identify family trees to which he or she may potentially belong. Linking a user to a family tree or building a family may be performed automatically, manually, or using techniques with a combination of both. In an embodiment of an automatic tree matching, the tree management engine 260 may receive a genetic dataset from the target individual as input and search related individuals that are IBD-related to the target individual. The tree management engine 260 may identify common ancestors. Each common ancestor may be a common to the target individual and one of the related individuals. The tree management engine 260 may in turn output potential family trees to which the target individual may belong by retrieving family trees that include a common ancestor and an individual who is IBD-related to the target individual. The tree management engine 260 may further identify one or more probable positions in one of the potential family trees based on information associated with matched genetic data between the target individual and DNA test takers in the potential family trees through one or more machine learning models or other heuristic algorithms. For example, the tree management engine 260 may try putting the target individual in various possible location in the family tree and determine the highest probability position(s) based on the genetic datasets of the target individual and other DNA test takes in the family tree and based on genealogical data available to the tree management engine 260. The tree management engine 260 may provide one or more family trees from which the target individual may select. For a suggested family tree, the tree management engine 260 may also provide information on how the target individual is related to other individuals in the tree. In a manual tree building, a user may browse through public family trees and public individual entries in the genealogy data store 200 and individual profile store 210 to look for potential relatives that can be added to the user's family tree. The tree management engine 260 may automatically search, rank, and suggest individuals for the user to conduct manual review as the user makes progress in the front-end interface 250 in building the family tree.

As used herein, "pedigree" and "family tree" may be interchangeable and may refer to a family tree chart or pedigree chart that shows, diagrammatically, family information, such as family history information, including parentage, offspring, spouses, siblings, or otherwise for any suitable number of generations and/or people, and/or data pertaining to persons represented in the chart. U.S. Patent Publication Application No., entitled "Linking Individual Datasets to a Database," US2021/0216556, published on Jul. 15, 2021, describes example embodiments of how an individual may be linked to existing family trees.

Example Data Tree Management Interface

Figure 3:
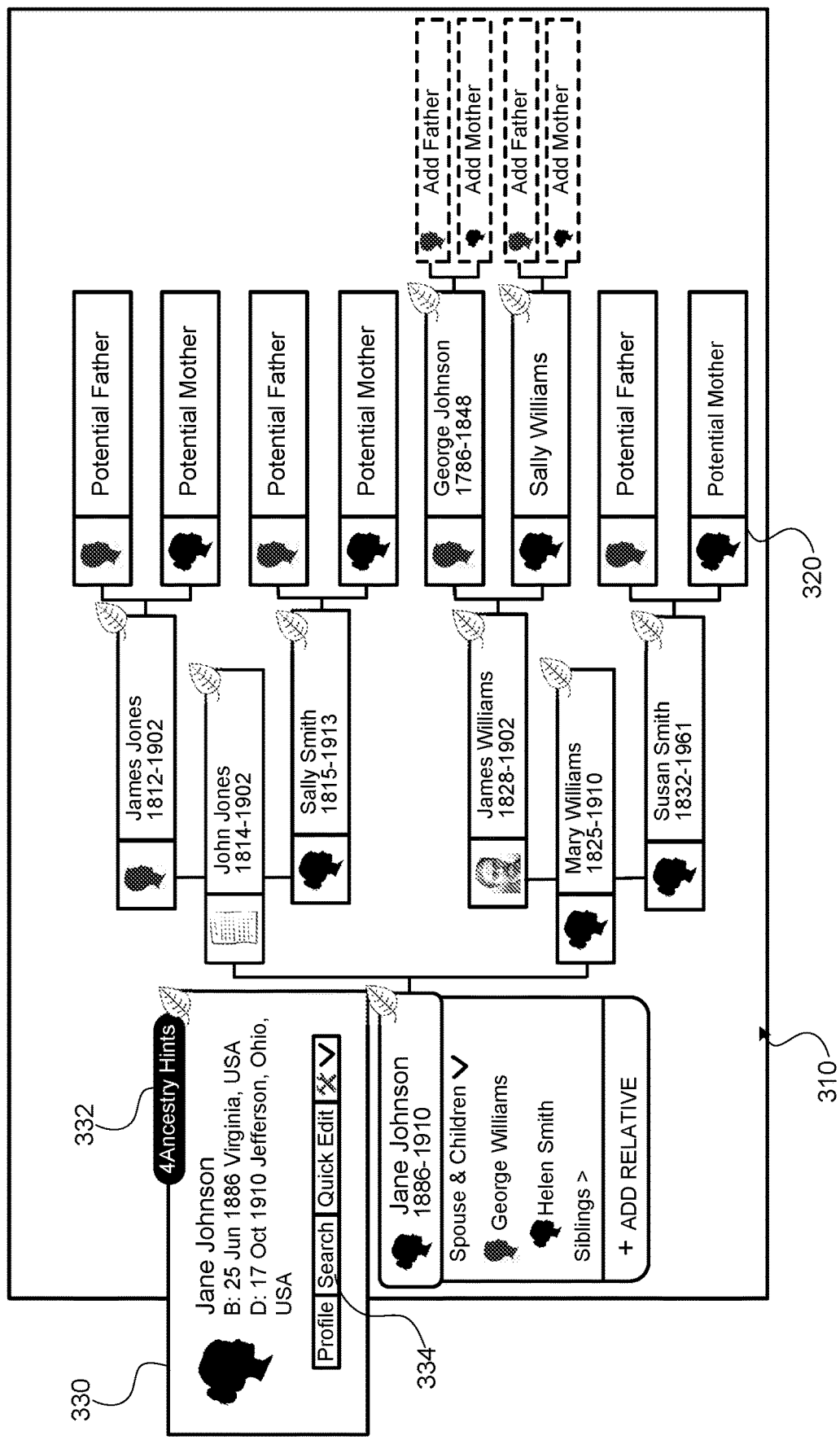
FIG. 3 is a conceptual diagram illustrating an example graphical user interface for a user to review and manage data tree associated with the user, in accordance with some embodiments.

FIG. 3 is a conceptual diagram illustrating an example graphical user interface 300 for a user to review and manage data trees associated with the user, in accordance with some embodiments. The graphical user interface 300 may be part of the front-end interface 250 that resides in a web browser or a mobile application of the user's device and communicates with the computing server 130. A data tree 310 in this example embodiment may take the form of a family tree that links relatives and ancestors of the user together. The data tree 310 may include various nodes 320 that are linked in a graph that represents the family tree. The nodes 320 are connected through edges. The nodes 320 in a database maintained by computing server 130 may take different forms. For example, some nodes 320 may represent individuals who are considered relatives (e.g., close family members, more distant cousins, ancestors) by the user. The user may discover the relationships between the user and an individual node available in the computing server 130 by genetic data and/or genealogical data. For example, the computing server 130 may suggest some DNA testers are IBD relatives of the user using the IBD estimation engine 225 for DNA testers who have enabled the proper privacy setting. The user may also browse through the public profiles of various individual and genealogical data records available in the computing server 130 to find various relatives. The nodes 320 may also take the form of genealogical data entries that are available in the computing server 130. In some cases, a node representing a genealogical data entry may be linked to a node representing an individual, such as in cases where another user has already identified that a genealogical data entry belongs to a particular individual. In other cases, the user may newly discover that a genealogical data entry is in fact a record of a relative in the user's data tree 310. The graphical user interface 300 allows the user to add, remove, and move various nodes 320 associated with the data tree 310 through the graphical user interface 300. Nodes that are addable to the data tree 310 may include a node that represents an individual and another node that is a genealogical data entry. The user may add a genealogical data entry node to the data tree 310 by linking the genealogical data entry to an individual in the data tree 310. The user may also add an individual node to the data tree 310 (e.g., adding a relative to the family tree).

By way of example, a user may first create a data tree with basic information. The user may then use the genealogy service to find supporting documents for the nodes in the tree. Information discovered from relevant documents can inspire users to create the next node. However, it is challenging to locate the right nodes because a family tree can contain hundreds of nodes and users may not know which nodes still have undiscovered documents.

A user may create a branch in the family, review details of a node 320, edit the node 320 and search data entry records potentially related to the node 320 by clicking on the node 320. For example, in FIG. 3, a pop-up window 330 may be displayed in response to the user clicking on one of the nodes 320. The computing server 130 may also provide hints 332 that suggest nodes that are potentially related to a particular node. The user may browse through different genealogical records and individuals stored in the computing server 130 and select nodes to be added to the data tree 310. For example, the user may click the search button 334 or the hints 332 and the graphical user interface 300 will display another page that allows the user to browse different nodes that are potentially addable to the data tree 310.

FIG. 4 is a conceptual diagram illustrating an example graphical user interface 400 for a user to review a list of nodes 410 that may be added to a data tree of the user, in accordance with some embodiments. Similar to graphical user interface 300, the graphical user interface 400 may be part of the front-end interface 250 that resides in a web browser or a mobile application of the user's device and communicates with the computing server 130. The graphical user interface 400 may be an example of a page that is displayed in response to the user clicking the search button 334 or the hints 332 of the graphical user interface 300. Each entry in the list 410 may represent a node that is potentially addable to a data tree 310. Although many users are interested in family history, it is common that users lack genealogical research skills to effectively build family trees. Users may break through this barrier by exploring the right nodes recommended by the computing server 130, which may still have missing information that can be discovered using the genealogy service offered.

The graphical user interface 400 allows a user to browse data associated with various nodes and interact with some of the nodes. The interactions available to the user may vary, depending on the embodiments and the functionality offered by the computing server 130. In some embodiments, possible interactions include clicking on the node to request additional data associated with the node (e.g., a pop-up window may be displayed to show the full detail of the node), saving the node for further review, printing the node, adding the node to a data tree associated with the user, and comparing the node with another node, such as putting the two nodes side-by-side for comparison. Other suitable interactions, ephemeral or persisting, public or private, data-tree related or not, are also possible. In some embodiments, the graphical user interface 400 may also allow a user to affirmatively select "ignore" for one or more nodes. The computing server 130 may treat the ignore button as a form of negative interaction or no interaction.

In some embodiments, the list 410 may take the form of a continuously updated set of nodes that is generated by the computing server 130. The continuously updated set of nodes may be updated based on past interactions of the user with one or more nodes. For example, the set of nodes that are selected for display in the graphical user interface 400 may be chosen based on the most recent past interactions performed by the user. In some embodiments, the computing server 130 monitors the actions selected by the user. As interactions are performed, the computing server 130 may track a set of recently interacted nodes. In some embodiments, the computing server 130 tracks a set of recently interacted nodes that are within the past N interactions (e.g., past 10 interactions). In some embodiments, the number in the past N interactions may be predetermined. In other embodiments, N may be dynamically determined based on one or more algorithms. The computing server 130 may use the recently interacted nodes to select candidate nodes to be displayed for the user. For example, the candidate nodes may be related to the recently interacted nodes by one or more selection criteria. As the computing server 130 continuously updates the recently interacted nodes in response to receiving additional interactions performed by the user, the computing server 130 updates the set of nodes presented in the graphical user interface 400 based on the recently interacted set of nodes. Detail and examples of the generating of the continuously updated set of nodes and the selection criteria of the nodes to be displayed are described in associated with FIG. 5 through FIG. 7.

In some embodiments, the computing server 130 may monitor various interactions of the user to evaluate the performance of the computing server 130 on node selection. In some embodiments, the evaluation may be based on one or more metrics. Example metrics may include relevancy, success rate, and other suitable, binary or score-like, automatically generated or manually assigned (e.g., by a manual rater), scalar or multi-dimension, metrics. In various embodiments, metrics such as relevancy and success rate may be defined differently. In some embodiments, the relevancy of a set of nodes presented to a user may correspond to the rate that a user interacts with one or more nodes in the set. For example, the set of nodes may be assigned with a high relevancy score if the user interacts with every one of the nodes. Another set of nodes may be assigned with a low relevancy score if the user interacts with only a small number of nodes or has chosen to ignore many nodes. In some embodiments, each type of interaction may have the same weight or a different weight in calculating the relevancy metric. For example, adding a node to a data tree may be weighted more heavily than a user clicking on a node to request more information. In some embodiments, the success rate may correspond to the rate that a user adds nodes (e.g., saving a record to the tree) to the data tree for a given set of nodes. The computing server 130 monitors various actions of the user and determines metrics for evaluating whether the lists of nodes presented to the users exemplified in FIG. 4 are appropriate. The historical data and metrics may be used to train a machine learning model that generates the continuously updated set of nodes.

Example Node Selection Process

Figure 5:
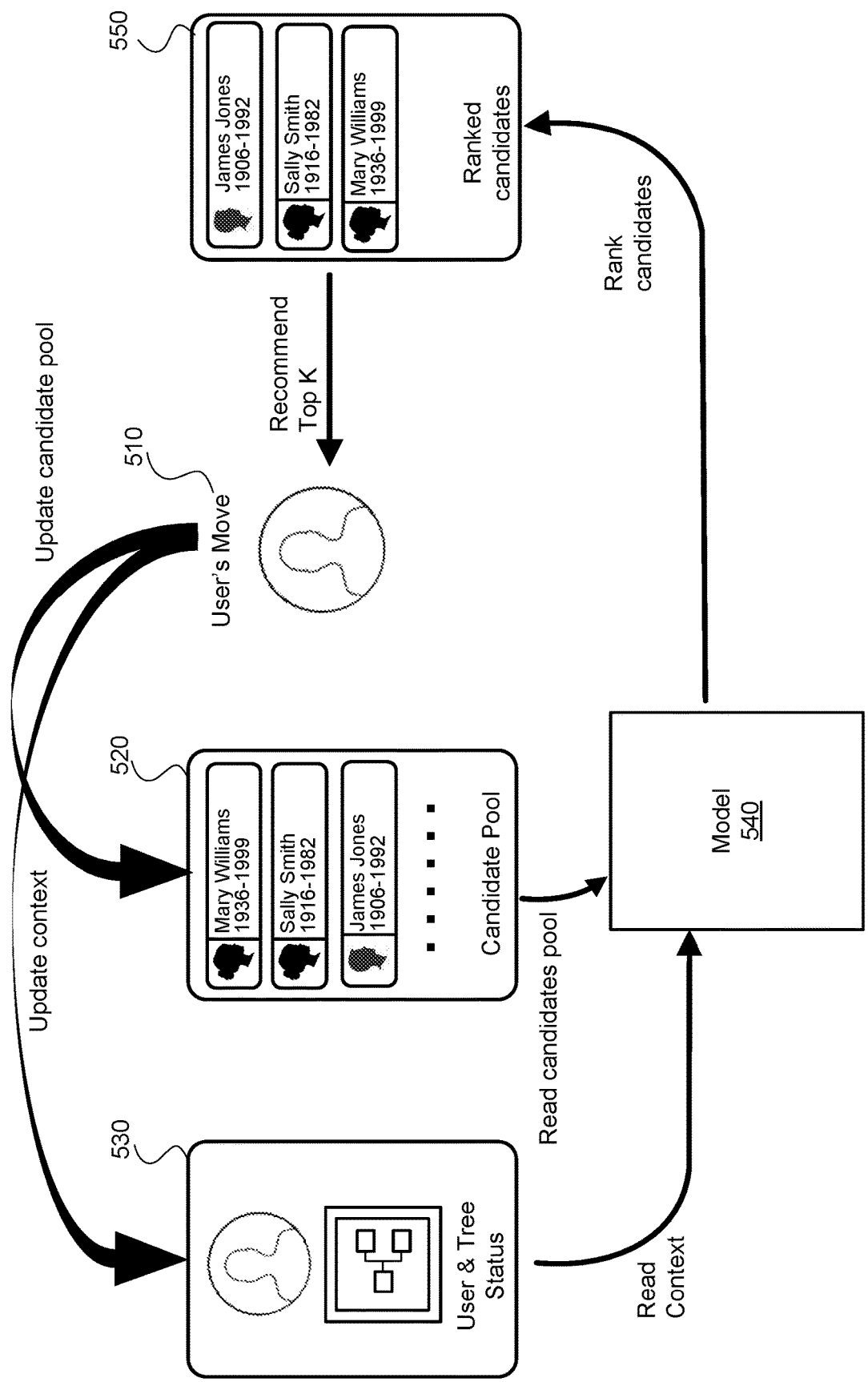
FIG. 5 is a block diagram illustrating an example process for selecting and ranking nodes for display in a graphical user interface based on the user's recently interacted nodes, in accordance with some embodiments.

FIG. 5 is a block diagram illustrating an example process 500 for selecting and ranking nodes for display in a graphical user interface based on the user's recently interacted nodes, in accordance with some embodiments. The process 500 may be performed by one or more engines of the computing server 130, such as the tree management engine 260. The process 500 allows the computing server 130 generates a set of nodes that are addable to a data tree. The set of nodes is displayed in a graphical user interface for the user to select nodes that may be added to the user's data tree (e.g., a family tree built by the user).

The process 500 may be a cyclic process in which the computing server 130 monitors the interactions of the user, tracks the most recently interacted nodes, and updates the next set of nodes that are going to be displayed in a graphical user interface. At a given cycle of the process 500, the computing server 130 receives a new selection 510 from the user to interact with a node. Based on the interaction, the computing server 130 updates the candidate pool 520 and the user and tree status 530. The computing server 130 converts the candidate pool 520 and the user and tree status 530 to features (e.g., feature vectors that are quantifiable). In turn, the actual set of nodes to be displayed by the computing server 130 are selected by the computing server 130. In some embodiments, the selection and ranking of nodes for display in a graphical user interface may be performed by a machine learning model 540. Training and structure of an example machine learning model will be further discussed in the next section. The machine learning model 540 outputs a ranked set of candidate nodes. The top K nodes in the ranked set may be displayed to the user in the graphical user interface. The computing server 130 tracks any new selection 610 from the user to interact with a node and the process 500 may be repeated.

The candidate pool 520 is a set of candidate nodes that may be selected for display. The computing server 130 may select the candidate nodes based on different methods in various embodiments. For example, the computing server 130 may conduct a keyword search to generate candidate nodes that are relevant to the user. In some embodiments, the computing server 130 may implement a domain boundary approach in selecting the candidate nodes. For example, the computing server 130 may collect candidate nodes that are within the domain boundary of at least one of interacted nodes in the recently interacted set. In some embodiments, the computing server 130 tracks a recently interacted set of nodes. The recently interacted set includes nodes that have been interacted with by the user within a number of past interactions. For example, the computing server 130 may identify nodes with which the user has interacted within N past interactions. The computing server 130 may then identify candidate nodes that are within domain boundaries of the recently interacted nodes. In some embodiments, a recently interacted node is associated with one or more data trees. The domain boundary of one of the interacted nodes is a boundary based on a degree of relationship from the interacted node. For example, some nodes are directly connected in a data tree. Other nodes are indirectly connected in a data tree through one or more intermediate nodes. The degree of relationship measures the distance between two nodes, such as the number of edges between two nodes. For example, a pair of intermediate adjacent nodes have a degree of relationship of one. A pair of nodes with two intermediate nodes has a degree of relationship of three. Domain boundary and selection of the nodes are further discussed in detail in FIG. 7. The computing server 130 may collect the nodes that are eligible for display as the candidate pool. The candidate pool at this stage may be unranked and may exceed the maximum number of nodes that will be displayed in a graphical user interface.

The user and tree status 530 may be different features that correspond to different measures related to the user and the data tree associated with the user. The user and tree status 530 may include one or more user-level features and one or more tree-level features. In some embodiments, example user-level features may include the user's age, gender, the subscription package of the user to the computing server 130, the hintability group, which measures how many hints the computing server 130 may be able to provide to the user, the user's engagement score, such as frequency of the user using the computing server 130, and skill scores associated with the user. Various features stored in individual profile store 210 may also be used. In some embodiments, example tree-level features may include the size of the tree associated with the user, the number of trees associated with the user, viewership of the tree among other users, year range of the tree, etc. Some of the user-level features and the tree-level features may be affected by the last interaction performed by the user. For example, the tree size may change if the last interaction of the user is to add a new node to the tree. As such, the computing server 130 may update the user and tree status 530 after receiving a new selection 510 from the user to interact with a node.

The computing server 130 inputs the candidate pool 520 and the user and tree status 530 to the machine learning model 540. For example, both the candidate pool 520 and user and tree status 530 may be converted into feature vectors. The computing server 130 inputs the first set of features associated with the user to the machine learning model 540. The computing server 130 also inputs the second set of features representing the candidate nodes to the machine learning model 540.

Various features may be inputted to the machine learning model 540. Example features may include relevancy features such as class of relationship, kinship label, recently interacted tag, kinship with respect to recently interacted nodes, hint-reject count, hint-maybe count, and hint-accept count. Additional or alternative features may further include success rate features such as node completeness, hint creation count, and node gender.

The machine learning model 540 is trained to rank the candidate pool 520 based on the features inputted to the machine learning model 540. In turn, the machine learning model 540 may output a ranked set of candidate nodes based on the first and second sets of features. The computing server 130 selects one or more candidate nodes as a continuously updated set 550 based on the ranking to display the nodes in the updated set to the user. For example, the computing server 130 may select the top K of nodes for display.

Example Machine Learning Model

In some embodiments, the machine learning model 540 may be a domain knowledge-guided Q learning (DKQ) model that integrates techniques in domain knowledge and reinforcement learning (RL) such as an offline reinforcement learning. DKQ may learn good policies from a diverse set of tree-building trajectories while incorporating domain knowledge from genealogists and previous customer and product analyses. An offline RL setting reduces potential disturbances of customer experience and ensures model performance before deployment. DKQ provides better tree-building policies because of the "reward" and "state" concepts in RL. The machine learning model 540 is driven by the goal of helping users make discoveries. The machine learning model 540 personalizes the next node suggestion based on the status of the user, family tree, and content, as illustrated in FIG. 5. Moreover, tree structures signifying kinship lead to novel definitions of action sets and domain knowledge.

In some embodiments, DKQ calculates the weighted average of Q value estimates from multiple action subsets, which can be selected based on domain knowledge. DKQ can result in conservative Q values. A case study demonstrates that DKQ also reduces the chance of obtaining unrealistic estimates for unseen actions, a common problem in offline RL. In some embodiments, the computing server 130 implements the fitted Q iteration for DKQ with Cat-Boost Regressor, a state-of-art gradient boosting tree algorithm, to effectively estimate Q from a set of categorical and numeric variables. While genealogy and building family trees are used as examples in this disclosure, various processes and a machine learning model 540 can be extended to other products and services where domain knowledge and rich user data are readily available.

In some embodiments, reinforcement learning may be described as a Markov Decision Process (MDP) defined by a tuple ($\mathcal{S}$, $\mathcal{A}$, r, P, γ). $\mathcal{S}$ and $\mathcal{A}$ respectively represent the state and action space. P (s'|s, a) represents the dynamics (transition probability), and r(s, a) is a reward function, which may be the objective function of the machine learning model 540. In some embodiments, the reward function, r, may be assumed to be uniformly bounded by $R_l$ and $R_u$, as represented by the formula $R_l \leq r(s, a) \leq R_u$, ∀s, a. γ∈[0,1) is the discount factor. The goal is to learn a policy π(a|s) that increases or maximizes the expected discounted cumulative reward. The action-value function for policy π is defined as $Q_\pi(s, a) = \mathbb{E}_\pi[\Sigma_{t=0}^\infty \gamma^t r(s_t, a_t)|S_0=s, A_0=a]$. The optimal action-value function is $Q^*(s, a) = \max_\pi Q_\pi(s, a)$. Let $\mathcal{T}$ represent the Bellman optimality operator for the action-value function defined as (1), then $Q^*$ is the fixed point of $\mathcal{T}$.

$$TQ(s, a) = r(s, a) + \gamma \mathbb{E}_{s' \sim P(s'|s,a)}\left[\max_{a'} Q(s', a')\right] \quad (1)$$

In some embodiments, the machine learning model 540 may be trained in an offline setting (e.g., training by batches). Domain knowledge may be incorporated into training procedures.

In some embodiments, domain knowledge may be defined as $F=\{(f_i, \alpha_i)\}_{i=1}^K$, where $f_i$: $\mathcal{A} \rightarrow \{0,1\}$ is an indicator function that describes a type of action, and $\alpha_i \in [0,1]$ is a normalized non-negative weight of importance, i.e., $\Sigma_{i=1}^K \alpha_i = 1$.

In some embodiments, the domain knowledge $\mathcal{F}$ may be interpreted as follows: If an action meets the constraint defined by $f_i$, the action has the importance measured by $\alpha_i$. For example, $f_i(a) = \mathbb{1}_{[e_i^T a > 0]}$ describes the action set {a∈ $\mathcal{A}$ |a[i]0}, where e is the unit vector on the direction of i-th axis. If domain experts believe that certain types of actions are not recommended, their weights can be set to zero. The data set may be denoted as $\mathcal{D}=\{(s_t, a_t, r_t, s'_t, \mathcal{T}_t)\}_{t=0}^T$, where $\tau_t$ is an indicator of termination.

The machine learning model 540 is used to help users grow their family trees by improving a genealogy service offered by computing server 130, where users can search for historical records, such as census records and birth certificates, to understand their heritage and family history. A reinforcement learning model may be applied because family tree building is a sequential task. In some embodiments, DKQ provides a solution that leverages both data and domain knowledge. Domain knowledge may come from consultation with professional genealogists, customer interviews and product analytics.

In some embodiments, the machine learning model 540 may include the following reward, state features, and action features that define the machine learning model 540. With respect to the reward, the goal of machine learning model 540 is to guide users to the right nodes where new information is most likely to be discovered. If the user finds a node (e.g., a record, a document) and believes that the node belongs to an individual (represented by a node on the family tree) in the data tree, the user may save the record to a tree. A record saved to the tree may be regarded as a "successful discovery" and may be assigned a high reward score (e.g., 10 points) in the objective function that represents the reward. If the user explores the node but saves no documents, a lower positive reward (e.g., 1 point) may be assigned.

With respect to the state features, a state may be characterized by one or more features in the user and tree status 530, including user profile information, product engagement level, genealogical skill level, number of nodes in the tree, and content availability. The content availability feature estimates the number of relevant documents in the genealogy service database of the computing server 130 for a particular tree.

With respect to the action features, an action may be a node in the family tree at a given timestamp. An action may be represented by a feature vector with one or more dimensions. Example dimensions may include focused node tag in the tree, generation, direct relative tag, recently being interacted, kinship, engagement history, and node status. The focused node in the tree may be specified by the user. The focused node tag may take the form of a binary feature to indicate whether the node is focused or not. Generation is the number of generations counted from the focused node. The direct relative tag indicates whether a node is on the direct line of kinship with the focused node, such as parents, grandparents, child, grandchild. The feature "recently being interacted" is a tag to track the last N nodes (e.g., 10 nodes) interacted by the user. Kinship includes the relationships of the target node with both focused node and recently interacted nodes. Engagement history is the aggregate engagement level of the target node up to a given timestamp. Node status captures the level of information completeness.

Domain knowledge is incorporated into the training. Domain knowledge may measure users' current interest as users are likely to continue working on nodes that the users recently interacted with and those around the mostly interacted node. In some embodiments, domain knowledge may be defined as follows:

$f_1(a)=1$ if a is one of the ten recently interacted nodes.
$f_2(a)=1$ if a is within two steps, in terms of kinship, from the ten recently interacted nodes.
$f_3(a)=1$ if a is within three generations around the focused node.
$f_4(a)=1$ if a is a direct relative of the focused node.

Otherwise, $f_i(a)=0$ for i=1, 2, 3, 4. The list of parameter values may be represented as $\alpha=[\alpha_1, \alpha_2, \alpha_3, \alpha_4]$.

Training of the machine learning model 540 may be based on historical interactions of users collected by the computing server 130. Each of the functions in the machine learning model 540 may be associated with different parameters (e.g., weights and coefficients) that are adjustable during training.

In a forward propagation of the training, training samples are input to the machine learning model 540 in the forward direction to generate one or more ranked set of candidate nodes. The performance of the set (e.g., in terms of relevancy and success rate) may be compared to the actual interactions recorded by the computing server 130. The forward propagation may be repeated for other samples in the training sets to compute the value of the objective function (e.g., reward) in a particular training round. In turn, the neural network performs backpropagation by using gradient descent such as stochastic gradient descent (SGD) to adjust the parameters in various functions to improve the reward. Multiple iterations of forward propagation and backpropagation may be performed. Training may be completed when the objective function has become sufficiently stable (e.g., the machine learning model has converged) or after a predetermined number of iterations for a particular set of training samples.

The model training process may be represented by the pseudocode that describes an algorithm below.

Algorithm 1 DK—FQI (f, α, γ, $\mathcal{D}$, N)

Figure 6:
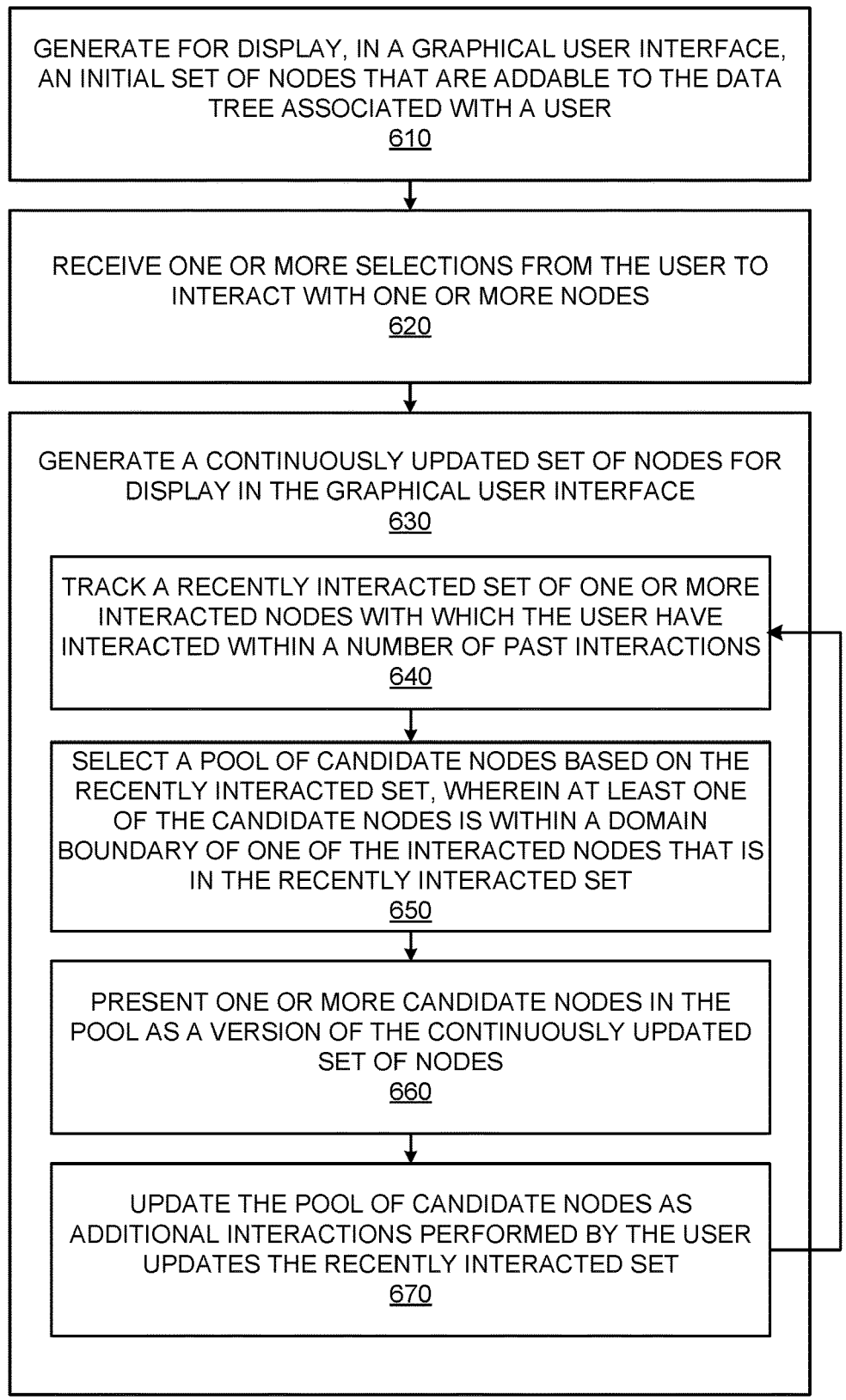
FIG. 6 is a flowchart depicting an example process for continuously updating a set of nodes addable to a data tree, in accordance with some embodiments.

1. Initialize $\hat{Q}_0 = 0$
2. for t = 1, . . . , T do
3. $x_t \leftarrow (s_t, a_t)$
4. end for
5. for n = 1, . . . , N do
6. Build the training set $D^{(n)} =$ $\{(x_t, y_t^{(n)})\}_{t=0}^T$ by setting each $y_t^{(n)}$ as follows:
7. $y_t^{(n)} \leftarrow r_t + \gamma \Sigma_{t-1}^K \alpha_i \max_{a' \in supp(f_i)} \hat{Q}_{\mathcal{F}}^{(n-1)}(s_t, a')$
   $\hat{Q}_{\mathcal{F}}^{(n-1)} \leftarrow$ regression_training($\mathcal{D}^i$)
8. end for
9. return $\hat{Q}_{\mathcal{F}}^{(N)}$ Example Process for Update of Nodes FIG. 6 is a flowchart depicting an example process 600 for continuously updating a set of nodes addable to a data tree, in accordance with some embodiments. The process 600 may be performed by one or more engines of the computing server 130, such as the tree management engine 260. The process 600 may be implemented as a software algorithm. The software algorithm may be stored as computer instructions that are executable by one or more general processors (e.g., CPUs, GPUs). The instructions, when executed by the processors, cause the processors to perform various steps described in the process 600.

The computing server 130 may generate 610 for display, in a graphical user interface, an initial set of nodes that are addable to the data tree associated with a user. The computing server 130 may generate the initial set of nodes in response to the user's selection. For example, the user may be in the process of managing a data tree (e.g., a family tree) associated with the user via a graphical user interface 300. The user decides to review hints provided by the computing server 130 or continue to add more records to one of the individuals in the family tree by searching through the genealogical database provided by computing server 130. Nodes that are addable to a data tree may take the form of a node representing an individual or a node representing a data record that can be linked to one of the individuals in the data tree. The initial list may be generated by any suitable process, such as a keyword search, a continuation of the past session records, or by performing some of the steps in the process 600.

The computing server 130 may receive 620 one or more selections from the user to interact with one or more nodes. In response to the user requesting one or more nodes recommended by the computing server 130, the computing server 130 causes a graphical user interface to display the initial set of nodes, which may take the form of a ranked list. An example graphical user interface 400 is illustrated in FIG. 4. The user may browse through the ranked list to select one or more records (nodes) to perform one or more actions related to one or more nodes. Example actions that may be performed by the user may include clicking the node to review additional data, saving the node, printing the node, adding the node to the data tree associated with the user, and/or comparing the node with another node. The computing server 130 keeps track of the interactions of the user and may define the latest certain number of interactions as the recent interactions.

The computing server 130 may generate 630 a continuously updated set of nodes for display in the graphical user interface. For example, the example list illustrated in the graphical user interface 400 may be continuously updated. The continuous update nature of the set does not imply that the set will be updated every second or every predetermined interval. Instead, the set may be continuously updated when the computing server 130 receives a new interaction performed by the user to one of the nodes. The update may be based on past interactions of the user with one or more nodes. As explained above, the update may be described as a Markov process in which the state and the action sequentially occur. In some embodiments, the recent interactions of the user, the recently interacted nodes, and the features of the user and the tree at a given point may constitute a state. The selection and ranking of a pool of candidate nodes for display given a state may constitute the action that is to be performed. The decision of what action to take may be determined by a machine learning model 540 that outputs a ranked list of the candidate nodes. The machine learning model may be a reinforcement model that is associated with a reward that monitors a success rate for nodes in the continuously updated set of nodes to be added to the data tree. The step generating 630 the continuously updated set of nodes may include one or more substeps 640-670 that can be repeated. The process 500 may also be an example process for generating the continuously updated set of nodes.

The computing server 130 may track 640 a recently interacted set of one or more interacted nodes with which the user has interacted within a number of past interactions. For example, the computing server 130 may track past N interactions (e.g., N=3) performed by the user. Each interaction may be associated with a node. The nodes that are associated with the past N interactions may be referred to as recently interacted nodes. For example, if the computing server 130 tracks past three interactions, the recently interacted set may include three nodes. The recently interacted set is updated as the user performs new interactions. Older interacted nodes are replaced by the most recently interacted nodes.

Figure 7:
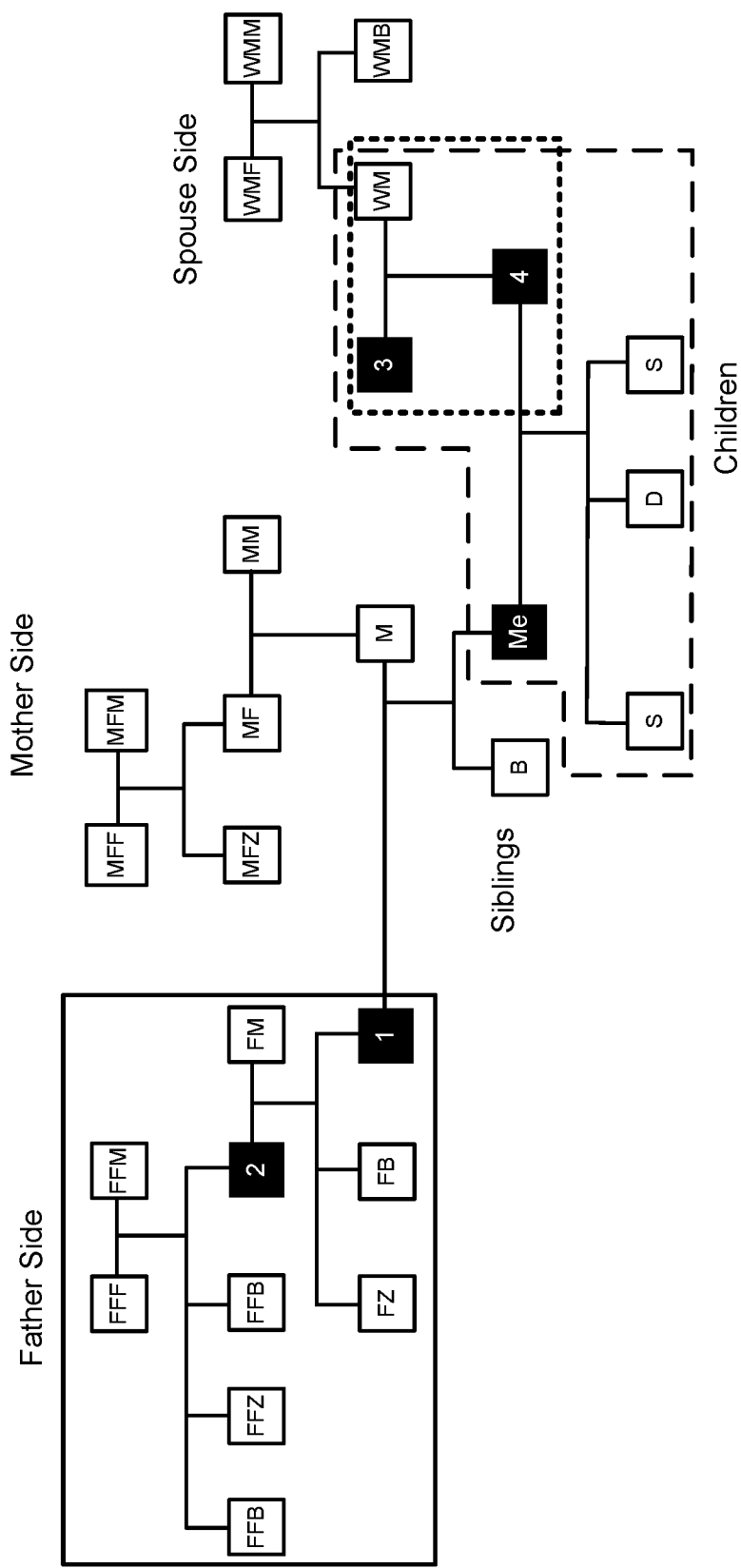
FIG. 7 is a block diagram illustrating an example data tree that takes the form of a family tree.

The computing server 130 may select 650 a pool of candidate nodes based on the recently interacted set. In some embodiments, at least one of the candidate nodes is within a domain boundary of one of the interacted nodes that is in the recently interacted set. For example, the computing server 130 may define one or more criteria to define a domain boundary around a recently interacted node. FIG. 7 is a block diagram illustrating an example data tree that takes the form of a family tree. One example criterion to define a domain boundary is a boundary based on a degree of relationship (kinship) from one of the recently interacted nodes. In FIG. 7, two recently interacted nodes are shaded for illustration purposes. An example degree of relationship may be defined as nodes around the degree of relationship of one from the recently interacted nodes. The domain boundaries under this definition are drawn in FIG. 7 as examples. The computing server 130 may use different factors to define the domain boundary. Example factors include different degrees of relationship, whether a candidate node is within a certain number of generations around a recently interacted node or around a focused node, whether a candidate node is a direct line relative of a recently interacted node, etc.

Referring back to FIG. 6, the computing server 130 may present 660 one or more candidate nodes in the pool as a version of the continuously updated set of nodes. In some embodiments, the computing server 130 may present the entire pool of candidate nodes as the continuously updated set of nodes. In some embodiments, the number of candidate nodes in the pool exceeds the maximum number of nodes allowed to be displayed. The computing server 130 uses the machine learning model 540 to rank the candidate nodes in the candidate pool. Top-ranked candidate nodes are presented as the continuously updated set of nodes.

The selection of candidate nodes to be included in the continuously updated set of nodes may be based on various factors such as one or more user-level features in user and tree status 530 and one or more tree-level features. Alternatively or additionally, the selection of candidate nodes to be included in the continuously updated set of nodes may be based on one or more relevancy features. A relevancy feature may measure a rate of an action taken by the user on a node. Alternatively or additionally, the selection of candidate nodes to be included in the continuously updated set of nodes may be based on one or more success rate features. A success rate feature may measure the rate of whether the user adds a node to the data tree.

The computing server 130 may update 670 the pool of candidate nodes as additional interactions performed by the user updates the recently interacted set. As the recently interacted nodes change, the domain boundaries also change with the recently interacted set. Hence, the candidate nodes that may be selected for display also change. As such, a new version of the continuously updated set of nodes may be displayed. The step 640 through 670 may be repeated to continuously update the set of nodes to be displayed in the graphical user interface.

Model Evaluation and Experimental Results

Various domain boundaries and control experiments are evaluated for performance in terms of mean reward on actions where the learned policy agrees/disagrees with the behavior policy. The experiments are summarized below in table 1.

TABLE 1

| | Experiment name | $R_+$ | $R_-$ |
|---|---|---|---|
| 1 | Ten recently interacted nodes | 13.92 | 7.21 |
| 2 | Around recently interacted nodes | 13.27 | 6.82 |
| 3 | Three generations around focused node | 16.74 | 8.19 |
| 4 | Direct relatives | 14.91 | 7.91 |
| 5 | Ten recently interacted nodes OR Around recently interacted nodes | 14.04 | 7.26 |
| 6 | Ten recently interacted nodes OR Three generations around focused node | 15.27 | 7.75 |
| 7 | Ten recently interacted nodes OR Direct relatives | 14.97 | 7.59 |
| 8 | Around recently interacted nodes OR Three generations around focused node | 14.84 | 7.72 |
| 9 | Around recently interacted nodes OR Direct relatives | 14.83 | 7.63 |

TABLE 1-continued

| | Experiment name | $R_+$ | $R_-$ |
|---|---|---|---|
| 10 | Three generations around focused node OR Direct relatives | 15.50 | 7.93 |
| 11 | Ten recently interacted nodes OR Around recently interacted nodes OR Director relatives | 14.79 | 7.68 |
| 12 | All nodes | 15.91 | 7.85 |
| 13 | Last interacted node (baseline) | 8.41 | 8.13 |

As discussed above, the list of domain boundary parameter values may be represented as $\alpha=[\alpha_1, \alpha_2, \alpha_3, \alpha_4]$. Table 2 below illustrates the parameter values for each experiment.

TABLE 2

| | Experiment name | $[\alpha_1, \alpha_2, \alpha_3, \alpha_4]$ |
|---|---|---|
| 1 | Ten recently interacted nodes | [1, 0, 0, 0] |
| 2 | Around recently interacted nodes | [0, 1, 0, 0] |
| 3 | Three generations around me-person | [0, 0, 1, 0] |
| 4 | Direct relatives | [0, 0, 0, 1] |
| 5 | Ten recently interacted nodes OR Around recently interacted nodes | [0.5, 0.5, 0, 0] |
| 6 | Ten recently interacted nodes OR Three generations around me-person | [0.5, 0, 0.5, 0] |
| 7 | Ten recently interacted nodes OR Direct relatives | [0.5, 0, 0, 0.5] |
| 8 | Around recently interacted nodes OR Three generations around me-person | [0, 0.5, 0.5, 0] |
| 9 | Around recently interacted nodes OR Direct relatives | [0, 0.5, 0, 0.5] |
| 10 | Three generations around me-person OR Direct relatives | [0, 0, 0.5, 0.5] |
| 11 | Ten recently interacted nodes OR Around recently interacted nodes OR Direct relatives | [0.5, 0.5, 0, 0.5] |
| 12 | All nodes | NA |
| 13 | Last interacted node (baseline) | NA |

In one embodiment, two baselines were compared: last interacted node (Table 1, line 13) and Q learning without domain knowledge (Table 1, line 12). The first baseline is a rule-based approach. Intuitively, the first baseline is safer because it rarely recommends a node far from customer intent. However, the first baseline follows the user behavior and is not driven by the success rate metric. On the other hand, the second baseline is completely data-driven. It may result in worse online performance due to too many unseen actions and unrealistic value estimates in offline training.

In the evaluation of the machine learning model, the expected average reward of the learned policy $\hat{\pi}$ defined as $$V(\hat{\pi}) = \frac{1}{T}\sum_{t=1}^{T}\mathbb{E}_{s \sim D_t}[r(s_t, \hat{\pi}(s_t))],$$

where $D_t$ is the marginal distribution of data at step t. The estimator is simplified as the mean reward on actions where the model agrees with the data, represented by $$R_+ = \frac{1}{T}\sum_{t=1}^{T}\mathbb{1}_{a_t=\hat{\pi}(s_t)} r(s_t, a_t).$$

similarly, the computing server 130 may define $$R_- = \frac{1}{T}\sum_{t=1}^{T} \mathbb{1}_{a_t \neq \hat{\pi}(s_t)} r(s_t, a_t).$$

Intuitively, the idea is to associate the difference between the behavior policy and the learned policy with a desired outcome, which is the reward or discoveries in this embodiment. The learned policy is expected to recommend high-reward actions in the behavioral data and deviate from low or no-reward actions. If the learned policy $\hat{\pi}$ is good, the reward should be high on actions where the behavior policy agrees with $\hat{\pi}$, and low on actions where the behavior policy disagrees with $\hat{\pi}$. Each learned policy may be examined as a high $R_+$ and a low $R_-$.

Figure 8:
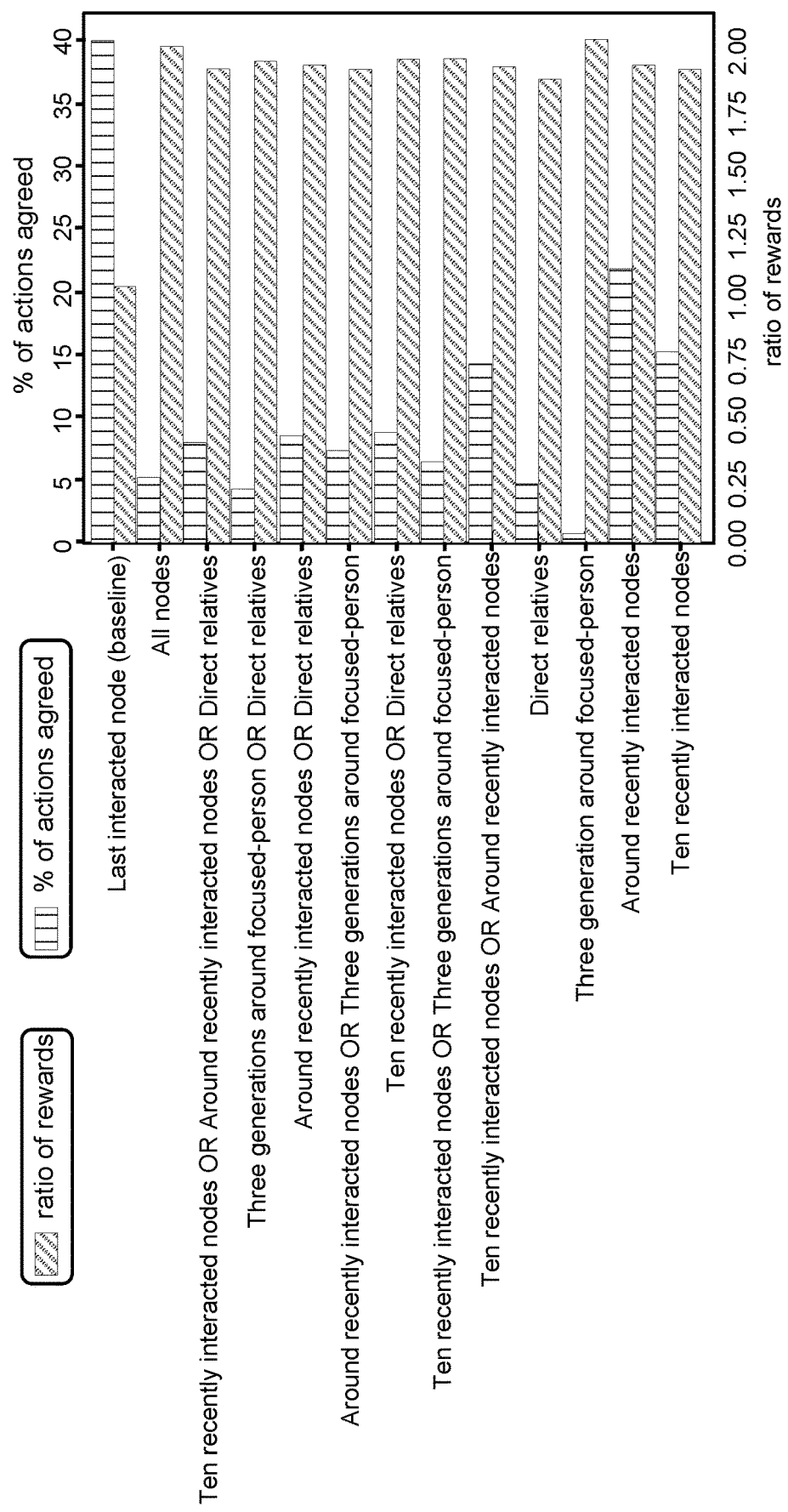
FIG. 8 is a graphical illustration of an experimental result with the ratio R+/R− and the proportion of the observed data agreed with the learned policy.

FIG. 8 is a graphical illustration of an experimental result with the ratio $R_+/R_-$ and the proportion of the observed data agreed with the learned policy. Considering the "ratio of rewards", the data-driven algorithms are evidently better than the rule-based baseline. The "percentage of actions agreed" of rule-based baseline is substantially larger than others. This also verifies that the domain knowledge partially reflects the behavior policy. The data-driven models have similar performance with respect to the "ratio of rewards", but differ in the "percentage of actions agreed". The baseline without domain knowledge represented by "All nodes" shows only about 5% agreement with the data, which is caused by a large number of out-of-distribution actions. The three variants guided by domain knowledge, "Ten recently interacted nodes", "Around recently interacted nodes" and "Ten recently interacted nodes OR Around recently interacted nodes", bold the highest "percentage of actions agreed" and relatively high "ratio of rewards". Therefore, policies generated from these three variants are promising criteria to be used to define domain boundaries.

FIG. 9 is a graphical illustration of another experimental result of the performance of some instances of example machine learning models 540 compared to baselines, in accordance with some embodiments. The result shows that the performance of 25.9% agreed with observed user behavior. A model also achieved 20.7% improvement in hint acceptance, 30.8% improvement in search success, and 20.4% improvement in other actions.

In another experiment, DKQ with random action sampling is also evaluated and compared to Batch-Constrained deep 100 Q-learning (BCQ). For DKQ, each Q-update maximizes over a subset of actions that are pre-determined by domain knowledge. BCQ restricts the action space by training a generative model to produce only actions. Action sampling in BCQ forces the offline agent to stay close to the previous behavioral policy. The same machine learning parameters function approximation were used in both methods.

Figure 10:
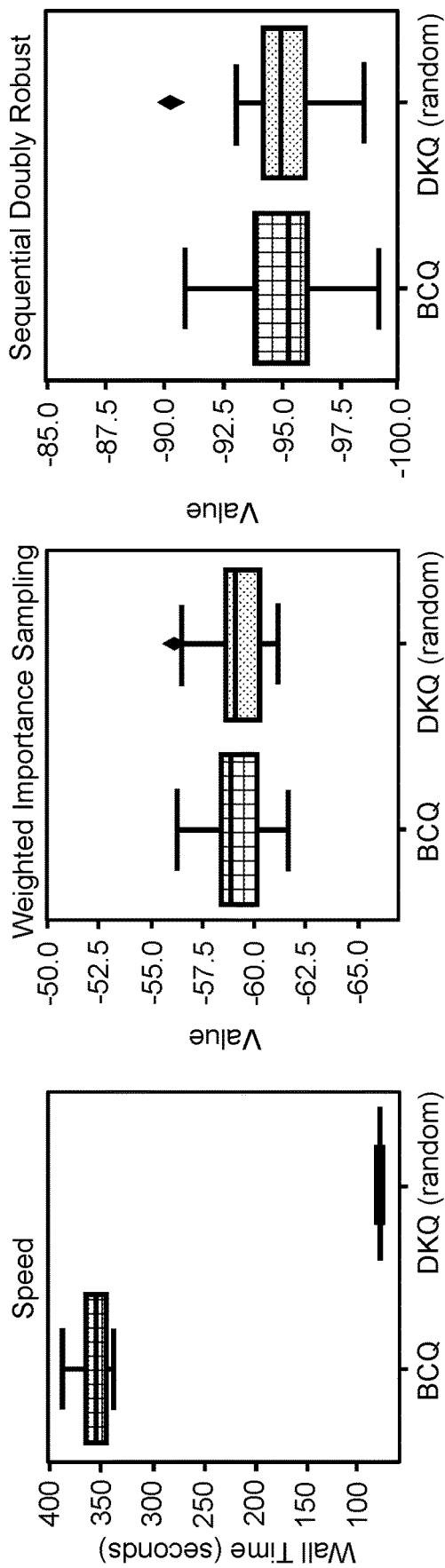
FIG. 10 is a graphical illustration comparing the performances of two different models with random action sampling.

A data set containing 30 episodes with an average of 325 transitions per episode were used. Both BCQ and DKQ were repeated 30 times with 100 epochs in each run. The output bias was initialized to −100. The wall time was evaluated for every 100 epochs and the best-performing agent of each run. FIG. 10 is a graphical illustration comparing the performances of BCQ and DKQ with random action sampling. Both models are comparable for both weighted importance sampling and sequential doubly robust estimators. DKQ with random action sampling is 4.5 times faster. The median computation time is 353 seconds and 77 seconds for BCQ and DKQ, respectively. This shows that the machine learning models described in this disclosure have shorter computation time and similar performance to BCQ as evaluated using weighted importance sampling and sequential doubly robust off-policy estimators.

Computing Machine Architecture

Figure 11:
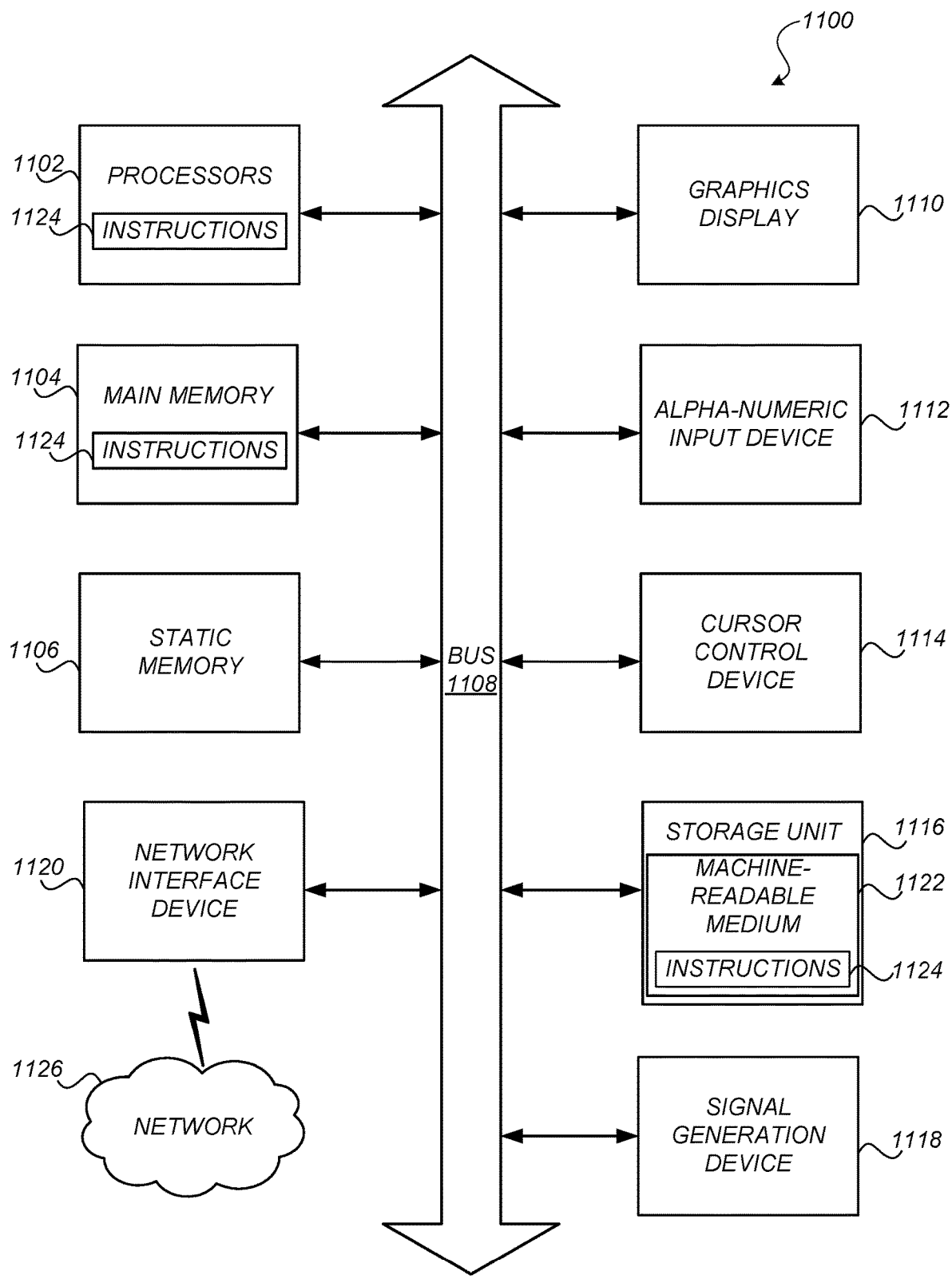
FIG. 11 is a block diagram of an example computing device, in accordance with some embodiments.

FIG. 11 is a block diagram illustrating components of an example computing machine that is capable of reading instructions from a computer-readable medium and executing them in a processor (or controller). A computer described herein may include a single computing machine shown in FIG. 11, a virtual machine, a distributed computing system that includes multiple nodes of computing machines shown in FIG. 11, or any other suitable arrangement of computing devices.

By way of example, FIG. 11 shows a diagrammatic representation of a computing machine in the example form of a computer system 1100 within which instructions 1124 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 11 may correspond to any software, hardware, or combined components shown in FIGS. 1 and 2, including but not limited to, the client device 110, the computing server 130, and various engines, interfaces, terminals, and machines shown in FIG. 2. While FIG. 11 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1124 that specify actions to be taken by that machine. Further, while only a single machine is illustrated, the term "machine" and "computer" may also be taken to include any collection of machines that individually or jointly execute instructions 1124 to perform any one or more of the methodologies discussed herein.

The example computer system 1100 includes one or more processors 1102 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 1100 may also include a memory 1104 that store computer code including instructions 1124 that may cause the processors 1102 to perform certain actions when the instructions are executed, directly or indirectly by the processors 1102. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One and more methods described herein improve the operation speed of the processors 1102 and reduces the space required for the memory 1104. For example, the database processing techniques and machine learning methods described herein reduce the complexity of the computation of the processors 1102 by applying one or more novel techniques that simplify the steps in training, reaching convergence, and generating results of the processors 1102. The algorithms described herein also reduce the size of the models and datasets to reduce the storage space requirement for memory 1104.

The performance of certain operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer some processes to be performed by a processor, this should be construed to include a joint operation of multiple distributed processors.

The computer system 1100 may include a main memory 1104, and a static memory 1106, which are configured to communicate with each other via a bus 1108. The computer system 1100 may further include a graphics display unit 1110 (e.g., a plasma display panel (PDP), a liquid crystal display (LCD), a projector, or a cathode ray tube (CRT)). The graphics display unit 1110, controlled by the processors 1102, displays a graphical user interface (GUI) to display one or more results and data generated by the processes described herein. The computer system 1100 may also include alphanumeric input device 1112 (e.g., a keyboard), a cursor control device 1114 (e.g., a mouse, a trackball, a joystick, a motion sensor, or other pointing instrument), a storage unit 1116 (a hard drive, a solid state drive, a hybrid drive, a memory disk, etc.), a signal generation device 1118 (e.g., a speaker), and a network interface device 1120, which also are configured to communicate via the bus 1108.

The storage unit 1116 includes a computer-readable medium 1122 on which is stored instructions 1124 embodying any one or more of the methodologies or functions described herein. The instructions 1124 may also reside, completely or at least partially, within the main memory 1104 or within the processor 1102 (e.g., within a processor's cache memory) during execution thereof by the computer system 1100, the main memory 1104 and the processor 1102 also constituting computer-readable media. The instructions 1124 may be transmitted or received over a network 1126 via the network interface device 1120.

While computer-readable medium 1122 is shown in an example embodiment to be a single medium, the term "computer-readable medium" should be taken to include a single medium or multiple media (e.g., a centralized or distributed database, or associated caches and servers) able to store instructions (e.g., instructions 1124). The computer-readable medium may include any medium that is capable of storing instructions (e.g., instructions 1124) for execution by the processors (e.g., processors 1102) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Additional Considerations

In some embodiments, the techniques described herein relate to a computer-implemented method for continuously updating a set of nodes addable to a data tree, the computer-implemented method including: generating for display, in a graphical user interface, an initial set of nodes that are addable to the data tree associated with a user; receiving one or more selections from the user to interact with one or more nodes; and generating a continuously updated set of nodes for display in the graphical user interface, wherein the continuously updated set of nodes is updated based on past interactions of the user with one or more nodes, wherein generating the continuously updated set of nodes includes: tracking a recently interacted set of one or more interacted nodes with which the user has interacted within a number of past interactions; selecting a pool of candidate nodes based on the recently interacted set, wherein at least one of the candidate nodes is within a domain boundary of one of the interacted nodes that is in the recently interacted set; presenting one or more candidate nodes in the pool as a version of the continuously updated set of nodes; and updating the pool of candidate nodes as additional interactions performed by the user updates the recently interacted set.

In some embodiments, the techniques described herein relate to a computer-implemented method, wherein selecting the pool of candidate nodes based on the set of one or more interacted nodes is performed by a machine learning model, selecting the pool of candidate nodes including: collecting candidate nodes that are within the domain boundary of at least one of interacted nodes in the recently interacted set; inputting a first set of features associated with the user to the machine learning model; inputting a second set of features representing the candidate nodes to the machine learning model; ranking the candidate nodes using the machine learning model based on the first and second sets of features; and selecting one or more candidate nodes as the continuously updated set based on the ranking.

In some embodiments, the techniques described herein relate to a computer-implemented method, wherein the machine learning model is a reinforcement model.

In some embodiments, the techniques described herein relate to a computer-implemented method, wherein the reinforcement model is associated with a reward, state features, and action features.

In some embodiments, the techniques described herein relate to a computer-implemented method, wherein the reward is associated with a success rate for nodes in the continuously updated set of nodes to be added to the data tree, the state features include a feature of the user, and the action features include a feature of a node.

In some embodiments, the techniques described herein relate to a computer-implemented method, wherein generating a continuously updated set of nodes is further based on one or more user-level features.

In some embodiments, the techniques described herein relate to a computer-implemented method, wherein generating a continuously updated set of nodes is further based on one or more tree-level features.

In some embodiments, the techniques described herein relate to a computer-implemented method, wherein generating a continuously updated set of nodes is further based on one or more relevancy features, a relevancy feature measuring a rate of an action taken by the user on a node.

In some embodiments, the techniques described herein relate to a computer-implemented method, wherein generating a continuously updated set of nodes is further based on one or more success rate features, a success rate feature measuring a rate of whether the user adds a node to the data tree.

In some embodiments, the techniques described herein relate to a computer-implemented method, wherein the data tree is a family tree associated with the user and a node is a genealogical record representing an individual.

In some embodiments, the techniques described herein relate to a computer-implemented method, wherein the domain boundary is a boundary based on a degree of relationship between two nodes.

In some embodiments, the techniques described herein relate to a computer-implemented method, wherein the user's interactions with one or more nodes including one or more of the following: clicking the node to review additional data, saving the node, printing the node, adding the node to the data tree associated with the user, and/or comparing the node with another node.

In some embodiments, the techniques described herein relate to a computer-implemented method, wherein the number of past interactions is predetermined.

In some embodiments, the techniques described herein relate to a system for continuously updating a set of nodes addable to a data tree, the system including: a graphical user interface configured to display a continuously updated set of nodes; and a computing device in communication with the graphical user interface, the computing device including memory and one or more processors, the memory configured to store code including instructions, the instructions, when executed by the one or more processors, cause the one or more processors to perform steps including: generating for display, in the graphical user interface, an initial set of nodes that are addable to the data tree associated with a user; receiving one or more selections from the user to interact with one or more nodes; and generating the continuously updated set of nodes for display in the graphical user interface, wherein the continuously updated set of nodes is updated based on past interactions of the user with one or more nodes, wherein generating the continuously updated set of nodes includes: tracking a recently interacted set of one or more interacted nodes with which the user has interacted within a number of past interactions; selecting a pool of candidate nodes based on the recently interacted set, wherein at least one of the candidate nodes is within a domain boundary of one of the interacted nodes that is in the recently interacted set; presenting one or more candidate nodes in the pool as a version of the continuously updated set of nodes; and updating the pool of candidate nodes as additional interactions performed by the user updates the recently interacted set.

In some embodiments, the techniques described herein relate to a system, wherein selecting the pool of candidate nodes based on the set of one or more interacted nodes is performed by a machine learning model, selecting the pool of candidate nodes including: collecting candidate nodes that are within the domain boundary of at least one of interacted nodes in the recently interacted set; inputting a first set of features associated with the user to the machine learning model; inputting a second set of features representing the candidate nodes to the machine learning model; ranking the candidate nodes using the machine learning model based on the first and second sets of features; and selecting one or more candidate nodes as the continuously updated set based on the ranking.

In some embodiments, the techniques described herein relate to a system, wherein the machine learning model is a reinforcement model.

In some embodiments, the techniques described herein relate to a system, wherein the reinforcement model is associated with a reward, state features, and action features.

In some embodiments, the techniques described herein relate to a system, wherein the reward is associated with a success rate for nodes in the continuously updated set of nodes to be added to the data tree, the state features include a feature of the user, and the action features include a feature of a node.

In some embodiments, the techniques described herein relate to a system, wherein the domain boundary is a boundary based on a degree of relationship between two nodes.

In some embodiments, the techniques described herein relate to a non-transitory computer-readable medium configured to store code including instructions, the instructions, when executed by one or more processors, cause the one or more processors to perform steps including: generating for display, in a graphical user interface, an initial set of nodes that are addable to a data tree associated with a user; receiving one or more selections from the user to interact with one or more nodes; and generating a continuously updated set of nodes for display in the graphical user interface, wherein the continuously updated set of nodes is updated based on past interactions of the user with one or more nodes, wherein generating the continuously updated set of nodes includes: tracking a recently interacted set of one or more interacted nodes with which the user has interacted within a number of past interactions; selecting a pool of candidate nodes based on the recently interacted set, wherein at least one of the candidate nodes is within a domain boundary of one of the interacted nodes that is in the recently interacted set; presenting one or more candidate nodes in the pool as a version of the continuously updated set of nodes; and updating the pool of candidate nodes as additional interactions performed by the user updates the recently interacted set.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The following applications are incorporated by reference in their entirety for all purposes: (1) U.S. Pat. No. 10,679,729, entitled "Haplotype Phasing Models," granted on Jun. 9, 2020, (2) U.S. Pat. No. 10,223,498, entitled "Discovering Population Structure from Patterns of Identity-By-Descent," granted on Mar. 5, 2019, (3) U.S. Pat. No. 10,720,229, entitled "Reducing Error in Predicted Genetic Relationships," granted on Jul. 21, 2020, (4) U.S. Pat. No. 10,558,930, entitled "Local Genetic Ethnicity Determination System," granted on Feb. 11, 2020, (5) U.S. Pat. No. 10,114,922, entitled "Identifying Ancestral Relationships Using a Continuous Stream of Input," granted on Oct. 30, 2018, and (6) U.S. Patent Publication Application No., entitled "Linking Individual Datasets to a Database," US2021/0216556, published on Jul. 15, 2021.

What is claimed is:

1. A computer-implemented method for continuously updating a set of nodes addable to a family tree, the computer-implemented method comprising:

generating for display, in a graphical user interface, an initial set of nodes that are addable to the family tree associated with a user;

receiving one or more selections from the user to interact with one or more genealogy nodes from the user interacting with the graphical user interface, a genealogy node corresponding to a genealogy data entry that is addable to the family tree; and generating a continuously updated set of nodes for display in the graphical user interface, the continuously updated set of nodes being recommendations of genealogy data entries based on user interactions of genealogy data series as the family tree is displayed to the user, wherein the continuously updated set of nodes is updated based on past interactions of the user with one or more nodes, wherein generating the continuously updated set of nodes comprises:

tracking one or more last user interactions of the user performed at the graphical user interface;

updating, based on the one or more last user interactions performed at the graphical user interface, a recently interacted set of one or more interacted nodes with which the user has interacted within a number of past interactions;

selecting a pool of candidate nodes based on the recently interacted set, wherein at least one of the candidate nodes is within a domain boundary of one of the interacted nodes that is in the recently interacted set, and the domain boundary is defined at least based on a degree of kinship between a candidate node and an interacted node defined in a second family tree, wherein selecting the pool of candidate nodes based on the recently interacted set is performed by a reinforcement machine learning model, selecting the pool of candidate nodes comprising:

collecting a plurality of candidate nodes that are within the domain boundary of at least one of the interacted nodes in the recently interacted set;

inputting a first set of features associated with the user to the reinforcement machine learning model, wherein the first set of features comprises user-level features and genealogical tree-level features;

inputting a second set of features representing the plurality of candidate nodes to the reinforcement machine learning model;

ranking the candidate nodes using the reinforcement machine learning model based on the first and second sets of features; and selecting one or more candidate nodes of the plurality of candidate nodes as the pool of candidate nodes based on the ranking;

presenting, at the user interface and responsive to the one or more last user interactions performed at the graphical user interface, one or more candidate nodes of the pool of candidate nodes as a version of the continuously updated set of nodes; and updating the pool of candidate nodes to be displayed in the graphical user interface as additional interactions that are performed by the user at the graphical user interface updates the recently interacted set.

2. The computer-implemented method of claim 1, wherein the reinforcement model is associated with a reward, state features, and action features.

3. The computer-implemented method of claim 2, wherein the reward is associated with a success rate for nodes in the continuously updated set of nodes to be added to the family tree, the state features comprise a feature of the user, and the action features comprise a feature of a node.

4. The computer-implemented method of claim 1, wherein generating a continuously updated set of nodes is further based on one or more relevancy features, a relevancy feature measuring a rate of an action taken by the user on a node.

5. The computer-implemented method of claim 1, wherein generating a continuously updated set of nodes is further based on one or more success rate features, a success rate feature measuring a rate of whether the user adds a node to the family tree.

6. The computer-implemented method of claim 1, wherein the family tree is associated with the user and a node is a genealogical record representing an individual.

7. The computer-implemented method of claim 1, wherein the domain boundary is a boundary based on a degree of relationship between two nodes.

8. The computer-implemented method of claim 1, wherein the user's interactions with one or more nodes comprising one or more of the following:
clicking the node to review additional data, saving the node, printing the node, adding the node to the family tree associated with the user, and/or comparing the node with another node.

9. The computer-implemented method of claim 1, wherein the number of past interactions is predetermined.

10. The computer-implemented method of claim 1, wherein the reinforcement machine learning model is trained to improve a reward state by performing backpropagation using gradient descent.

11. The computer-implemented method of claim 2, wherein the reinforcement machine learning model assigns a higher reward score to a save user event than to a no-save user event.

12. The computer-implemented method of claim 1, wherein the degree of kinship comprises one or more of: a number of genealogical generations between the interacted node and the candidate node, a direct-line genealogical relationship between the interacted node and the candidate node, and two steps of genealogical separation between the interacted node and the candidate node.

13. The computer-implemented method of claim 1, wherein the reinforcement machine learning model is trained based on historical interactions of users.

14. A system for continuously updating a set of nodes addable to a family tree, the system comprising:
a graphical user interface configured to display a continuously updated set of nodes; and
a computing device in communication with the graphical user interface, the computing device comprising memory and one or more processors, the memory configured to store code comprising instructions, the instructions, when executed by the one or more processors, cause the one or more processors to perform steps comprising:
generating for display, in the graphical user interface, an initial set of nodes that are addable to the family tree associated with a user;
receiving one or more selections of one or more genealogy nodes from the user interacting with the graphical user interface, a genealogy node corresponding to a genealogy data entry that is addable to the family tree; and
generating the continuously updated set of nodes for display in the graphical user interface, the continuously updated set of nodes being recommendations of genealogy data entries based on user interactions of genealogy data series as the family tree is displayed to the user, wherein the continuously updated set of nodes is updated based on past interactions of the user with one or more nodes, wherein generating the continuously updated set of nodes comprises:
tracking one or more last user interactions of the user performed at the graphical user interface;
updating, based on the one or more last user interactions performed at the graphical user interface, a recently interacted set of one or more interacted nodes with which the user has interacted within a number of past interactions; and
selecting a pool of candidate nodes based on the recently interacted set, wherein at least one of the candidate nodes is within a domain boundary of one of the interacted nodes that is in the recently interacted set, and the domain boundary is at least based on a degree of kinship between a candidate node and an interacted node defined in a second family tree, wherein selecting the pool of candidate nodes based on the recently interacted set is performed by a reinforcement machine learning model, selecting the pool of candidate nodes comprising:
collecting a plurality of candidate nodes that are within the domain boundary of at least one of the interacted nodes in the recently interacted set;
inputting a first set of features associated with the user to the reinforcement machine learning model, wherein the first set of features comprises user-level features and genealogical tree-level features;
inputting a second set of features representing the plurality of candidate nodes to the reinforcement machine learning model;
ranking the candidate nodes using the reinforcement machine learning model based on the first and second sets of features; and
selecting one or more candidate nodes of the plurality of candidate nodes as the pool of candidate nodes based on the ranking;
presenting at the graphical user interface and responsive to the one or more last user interactions performed at the graphical user interface, one or more candidate nodes of the pool of candidate nodes as a version of the continuously updated set of nodes; and
updating the pool of candidate nodes to be displayed in the graphical user interface as additional interactions that are performed by the user at the graphical user interface updates the recently interacted set.

15. The system of claim 14, wherein the reinforcement model is associated with a reward, state features, and action features.

16. The system of claim 15, wherein the reward is associated with a success rate for nodes in the continuously updated set of nodes to be added to the family tree, the state features comprise a feature of the user, and the action features comprise a feature of a node.

17. A non-transitory computer-readable medium configured to store code comprising instructions, the instructions, when executed by one or more processors, cause the one or more processors to perform steps comprising:

generating for display, in the graphical user interface, an initial set of nodes that are addable to the family tree associated with a user;

receiving one or more selections of one or more genealogy nodes from the user interacting with the graphical user interface, a genealogy node corresponding to a genealogy data entry that is addable to the family tree; and generating the continuously updated set of nodes for display in the graphical user interface, the continuously updated set of nodes being recommendations of genealogy data entries based on user interactions of genealogy data series as the family tree is displayed to the user, wherein the continuously updated set of nodes is updated based on a predetermined number of past interactions of the user with one or more nodes, wherein generating the continuously updated set of nodes comprises:

tracking one or more last user interactions of the user performed at the graphical user interface;

updating, based on the last user interactions performed at the graphical user interface, a recently interacted set of one or more interacted nodes with which the user has interacted within a number of past interactions; and selecting a pool of candidate nodes based on the recently interacted set, wherein at least one of the candidate nodes is within a domain boundary of one of the interacted nodes that is in the recently interacted set, and the domain boundary is at least based on a degree of kinship between a candidate node and an interacted node defined in a second family tree, wherein selecting the pool of candidate nodes based on the recently interacted set is performed by a reinforcement machine learning model, selecting the pool of candidate nodes comprising:

collecting a plurality of candidate nodes that are within the domain boundary of at least one of the interacted nodes in the recently interacted set;

inputting a first set of features associated with the user to the reinforcement machine learning model, wherein the first set of features comprises user-level features and genealogical tree-level features;

inputting a second set of features representing the plurality of candidate nodes to the reinforcement machine learning model;

ranking the candidate nodes using the reinforcement machine learning model based on the first and second sets of features; and selecting one or more candidate nodes of the plurality of candidate nodes as the pool of candidate nodes based on the ranking;

presenting at the graphical user interface and responsive to the one or more last user interactions performed at the graphical user interface, one or more candidate nodes of the pool of candidate nodes as a version of the continuously updated set of nodes; and updating the pool of candidate nodes to be displayed in the graphical user interface as additional interactions that are performed by the user at the graphical user interface updates the recently interacted set.

* * * * *